(12) United States Patent
Sinden et al.

(10) Patent No.: US 7,510,132 B2
(45) Date of Patent: Mar. 31, 2009

(54) LINEAR-FEED IRRIGATION APPARATUS AND RELATED METHOD

(75) Inventors: Joseph D. Sinden, Walla Walla, WA (US); Rex D. Ness, Walla Walla, WA (US); Chad D. Leinweber, Walla Walla, WA (US); Richard J. Berrier, Walla Walla, WA (US); Craig Nelson, Walla Walla, WA (US); Robert Rupar, Walla Walla, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 185 days.

(21) Appl. No.: 11/582,374

(22) Filed: Oct. 18, 2006

(65) Prior Publication Data

US 2007/0063078 A1    Mar. 22, 2007

Related U.S. Application Data

(62) Division of application No. 10/892,494, filed on Jul. 16, 2004, now Pat. No. 7,140,563.

(51) Int. Cl.
   *B05B 3/00* (2006.01)
   *B05B 15/06* (2006.01)
(52) U.S. Cl. ............... 239/722; 239/723; 239/726; 239/729; 239/749; 239/281
(58) Field of Classification Search ........... 239/722, 239/723, 725, 726, 740, 729, 730, 732, 742, 239/748, 749, 753, 280, 280.5, 281
   See application file for complete search history.

(56) References Cited

U.S. PATENT DOCUMENTS 1,142,448 A    6/1915    Lord
(Continued)

FOREIGN PATENT DOCUMENTS

CA    924353    4/1973
(Continued)

OTHER PUBLICATIONS

Sinden et al., entitled, "Traveling Sprinkler Incorporating Automatic Water Supply Valve Docking Station," U.S. Appl. No. 10/921,296, filed Aug. 19, 2004, pending.
(Continued)

*Primary Examiner*—Davis Hwu
(74) *Attorney, Agent, or Firm*—Nixon Vanderhye, P.C.

(57) ABSTRACT

A linear water feed apparatus for use in agricultural irrigation includes a linear-move machine with a mobile truss assembly supporting a plurality of individual sprinklers and adapted for movement in a specified direction across a field to be irrigated. The truss assembly is oriented transverse to the specified direction, and a supply pipe is arranged in the specified direction along or within the field to be irrigated. The supply pipe mounts a plurality of water supply hydrants at spaced locations along the pipe, each of the hydrants enclosing a water supply valve. A docking station is supported at one end of the truss assembly closest to the supply pipe, and is adapted to engage and open successive ones of the water supply valves in the plurality of hydrants. The docking station assembly includes a docking station that is suspended from a frame for floating movement about at least three mutually perpendicular axes.

20 Claims, 33 Drawing Sheets

U.S. PATENT DOCUMENTS

| | | |
|---|---|---|
| 1,651,582 A | 12/1927 | Buckner |
| 1,984,531 A | 12/1934 | Kind et al. |
| 2,122,079 A | 6/1938 | Wilson |
| 2,474,071 A | 6/1949 | Stetson |
| 2,750,228 A | 6/1956 | Engel |
| 3,321,138 A | 5/1967 | Curry |
| 3,444,941 A | 5/1969 | Purtell |
| 3,463,175 A | 8/1969 | Rogers |
| 3,575,200 A | 4/1971 | Imeson |
| 3,592,220 A | 7/1971 | Reinke |
| 3,608,825 A | 9/1971 | Reinke |
| 3,608,827 A | 9/1971 | Kinkead |
| 3,679,135 A | 7/1972 | Grosch |
| 3,710,818 A | 1/1973 | Imeson |
| 3,729,016 A | 4/1973 | Von Linsowe |
| 3,729,141 A | 4/1973 | Cornelius |
| 3,741,238 A | 6/1973 | Lacey |
| 3,970,102 A | 7/1976 | Harvey |
| 3,972,477 A | 8/1976 | Laureau |
| 3,984,052 A | 10/1976 | Di Palma |
| 4,003,519 A | 1/1977 | Kruse et al. |
| 4,036,436 A | 7/1977 | Standal |
| 4,182,493 A | 1/1980 | Murray |
| 4,192,335 A | 3/1980 | Standal |
| 4,204,642 A | 5/1980 | Hunter |
| 4,240,461 A | 12/1980 | Harvey |
| 4,252,275 A | 2/1981 | Standal |
| 4,265,404 A | 5/1981 | Hunter |
| 4,274,584 A | 6/1981 | Noble |
| 4,295,607 A | 10/1981 | Noble |
| 4,350,295 A | 9/1982 | Gheen |
| 4,412,655 A | 11/1983 | Noble |
| 4,413,783 A | 11/1983 | Ostrom et al. |
| 4,421,274 A | 12/1983 | Noble |
| 4,442,974 A | 4/1984 | Noble |
| 4,442,976 A | 4/1984 | Noble |
| 4,467,962 A | 8/1984 | Noble |
| 4,489,888 A | 12/1984 | Rinkewich |
| 4,522,338 A | 6/1985 | Williams |
| 4,553,699 A | 11/1985 | Bengtsson |
| 4,561,459 A | 12/1985 | Jackman |
| 4,682,736 A | 7/1987 | Wieck |
| 4,730,773 A | 3/1988 | Meyer |
| 4,809,910 A | 3/1989 | Meyer |
| 4,811,248 A | 3/1989 | Senoh et al. |
| 4,842,204 A | 6/1989 | Debruhl, Jr. |
| 4,877,189 A | 10/1989 | Williams |
| 5,080,290 A | 1/1992 | Ostrom |
| 5,340,078 A | 8/1994 | Dean |
| 5,810,051 A | 9/1998 | Campagna et al. |
| 6,125,868 A | 10/2000 | Murphy et al. |
| 6,431,475 B1 | 8/2002 | Williams |

FOREIGN PATENT DOCUMENTS

| | | |
|---|---|---|
| EP | 1044496 | 12/1954 |
| FR | 561667 | 10/1923 |
| GB | 2 026 293 A | 2/1980 |
| GB | 2026293 | 2/1980 |
| WO | WO 87/00724 | 2/1987 |

OTHER PUBLICATIONS

Sinden et al., entitled, "Power-Assisted Docking Station for Mobile Irrigation Apparatus," U.S. Appl. No. 11/413,029, filed Apr. 28, 2006, pending.

LINEAR-FEED IRRIGATION APPARATUS AND RELATED METHOD

This application is a divisional of application no. 10/892,494, filed Jul. 16, 2004, now U.S. Pat. No. 7,140,563.

BACKGROUND OF THE INVENTION

This invention relates to apparatus used for agricultural irrigation, and more specifically, to a linear water feed mechanism that automatically and successively engages and disengages spaced hydrants mounted on a water supply pipe extending alongside or through a field to be irrigated.

Mobile irrigation systems having elevated boom or truss assemblies carrying multiple sprinklers are typically of the center pivot-type or the linear- (or lateral-) move-type. In a center-pivot machine, the elevated truss assembly pivots about an upright standpipe that supplies water to the sprinklers attached to the truss assembly. In a linear-move machine, the elevated truss assembly is carried on mobile, wheeled towers that move the machine linearly along a path that is perpendicular to the elevated boom or truss. Typically, the linear-move machine travels from one end of a field to the other and back again, and sprinkling typically occurs in both directions.

While linear-move machines can irrigate more area than center-pivot machines by reason of the resulting rectangularly-shaped irrigation pattern, the linear-move machines have proven to be problematic in several respects. The most significant problem relates to the manner in which water is supplied to the machine. In some cases, the machine travels alongside an open ditch or canal from which water is continuously removed. Ditch water is typically filled with dirt and/or debris that can clog the sprinkler nozzles. In other cases, one or more hoses are dragged by the machine the length of the field, requiring one or more manual attachment/detachment procedures and attendant issues of hose management. In still other cases, complex mechanisms have been proposed for automatic docking with hydrants spaced along the length of a water supply pipe. One of the problems with this arrangement is that the hydrant risers have had to be held firmly in concrete or welded onto steel pipe. Alignment mechanisms have been complex and costly to maintain. As a result, reliable docking under various conditions has proven to be an elusive goal, and we are unaware of any automatic docking mechanisms that have achieved a significant degree of commercial success to date.

BRIEF DESCRIPTION OF THE INVENTION

This invention relates to a unique "floating" docking station assembly that can be added to essentially any new or existing linear-move machine. The docking station assembly is supported and controlled so as to reliably and effectively capture each hydrant, open the hydrant water-supply valve to permit water to be supplied to the sprinklers on the truss assembly, close the valve, and then disengage from the hydrant for movement with the machine to the next hydrant. The "floating" docking station as described herein also minimizes the load placed on the hydrant, thus permitting a simpler main line construction.

The docking station per se is formed by a pair of housings sandwiched about a hydrant valve actuator. The two housings support multiple pairs of guide wheels adapted to engage a round plate or flange on the hydrants. The housings also support docking stops and related mechanical and electrical hardware for halting the movement of the machine and docking station when properly aligned with the hydrant valve, opening and closing the valve, and subsequently permitting the resumption of machine movement after the allotted sprinkling time has expired. The docking station is resiliently suspended, or hung, from a supporting frame that, in turn, supports related hydraulic and electrical hardware as described in further detail below.

Two pairs of vertically-oriented, angled guide wings respectively mounted on the front and back of the docking station supporting frame, along with one pair of horizontally-oriented front and back guide wings, assist in "capturing" the hydrants on the water supply pipe. In this regard, the docking station is operable in opposite forward and rearward directions of movement of the linear-move machine, with no change or adjustment in any of the component parts. For purposes of this application, therefore, any use of "front" or "forward," etc. is intended to refer to the ends of the machine, docking station, etc. that lead in the direction of initial movement of the machine, i.e., along a path $P_1$ as shown in FIG. 1. Use of "back" or "rearward," etc. is intended to refer to the opposite ends of the machine, docking station, etc. that trail in the movement along path $P_1$ but that lead in movement in the opposite direction along a path $P_2$.

To ensure consistent and effective hydrant engagement via interaction with the guide wings, the docking station is arranged and supported so as to permit several degrees of movement:

1. The docking station is resiliently suspended or hung from its supporting frame by elongated coil springs (or equivalents) extending vertically between the docking station and the docking station supporting frame to enable up and down or vertical movement, but also to facilitate front-to-back, side-to-side and compound movements, i.e., tilting and twisting movements.

2. Spring-loaded, compressible tie rods extend horizontally between the supporting frame and docking station utilizing swivel bushings to enable front-to-back horizontal movement, but also to facilitate the limited vertical, side-to-side and compound movements.

3. The docking station and its supporting frame are also movable laterally on a carriage or trolley along a pair of rails extending perpendicularly to the path of movement of the machine so as to permit a wide range of lateral adjustment to accommodate a similarly wide range of hydrant misalignment situations.

In addition to movements that relate to hydrant capture, the docking station trolley is also movable to any number of positions along a rigid side beam secured to one side of a drive tower of the linear-move machine. This allows for manual or automatic adjustment of the water distribution pattern between the forward and return movements of the linear-move machine, or for subsequent forward movements along the path as further described herein.

In order to facilitate the docking operation, a new hydrant design has been adopted for use with the docking station of the linear-move machine. The hydrant in accordance with an exemplary embodiment includes a standard vertical pipe or riser fixed to the water supply pipe. At the upper end of the riser, a valve housing is attached by any suitable means and incorporates a spring-loaded valve assembly. The upper end of the valve housing is formed with an exterior, round, horizontal flange or plate that cooperates with the docking station during capture of the hydrant. The valve itself projects above the top of the flange to facilitate alignment with the hydrant valve actuator on the docking station. Alternatively, existing hydrant risers with compatible valves may be modified simply to include the round flange or plate to facilitate capture.

Another alternative is the use of a conversion kit to render existing hydrants compatible with the docking station.

The hydrant valve actuator carried by the docking station includes a housing that incorporates a piston/cylinder, the piston portion of which is movable within an enlarged chamber in the actuator housing. "Extend" and "retract" cavities are formed on either side of (i.e., above and below) the piston portion (or simply "piston") with the assistance of a pair of rolling diaphragms attached between the piston and the actuator housing. Briefly, water under pressure introduced into the "extend" diaphragm cavity will push the piston/cylinder downwardly such that the lower edge of the cylinder will engage the hydrant valve and push it downwardly away from the valve seat to open the valve. Water can then be supplied to the sprinklers on the truss assembly via another conduit connecting the valve actuator to a distribution pipe on the truss assembly. When a pre-programmed sprinkling time has expired, water under pressure introduced into the "retract" cavity will drive the piston/cylinder upwardly and back into the hydrant valve actuator, closing the valve prior to movement to the next hydrant.

It is another feature of the invention to facilitate different operating modes for the linear-move machine. For example, the machine may be used in a simple start/stop irrigation mode where the docking station is fixed to the side beam at the desired location, and the machine moves from hydrant to hydrant, stopping at each for a pre-programmed period of time for sprinkling. The water supply is cut off by a main control valve while the machine moves to the next hydrant.

It is also possible to manually adjust the position of the docking station along the side beam to vary the sprinkling pattern, for example, on the return path of the linear-move machine, to thereby provide more uniform application of water in the irrigated field. Alternatively, well-known drive and control devices may be utilized to automatically move the docking station along the side beam from one position to another.

In another mode, a second movable side beam may be mounted adjacent the first fixed side beam. The docking station is mounted on the second movable beam (or telescoping arm) for movement from one end of the arm to the other, while the telescoping arm itself is movable from an extended forward position to an extended rearward position relative to the fixed beam. This arrangement allows the docking station to engage a first hydrant, with the docking station at the forward end of the telescoping arm, and the telescoping arm in its extended forward position. As the linear-move machine (and fixed beam) moves forwardly, the telescoping arm slides (relative to the fixed side beam and hence the machine as a whole) to an extended rearward position, causing the docking station to be driven to the rearward end of the telescoping arm. After disengagement from the first hydrant valve, the telescoping arm and docking station are moved to their extended forward positions for engagement with the second hydrant valve. This cycle is repeated as the linear-move machine continues to travel the length of the field.

In a full automatic mode, additional hardware changes are required. In the exemplary embodiment, parallel inner and outer fixed beams are attached to the end tower of the linear-move machine, and a docking station is mounted for reciprocatory movement on each. Flexible hoses connect each docking station to the distribution pipe on the truss assembly of the linear-move machine. At the same time, the water supply pipe is modified to the extent that alternate hydrants are offset in opposite lateral directions from the supply pipe to permit engagement with the respective inner and outer docking stations. The docking stations are movable along the respective inner and outer fixed beams by any suitable drive mechanism.

In an exemplary mode of operation, the outer docking station will be located at the forward end of the outer fixed beam and engage a first outer hydrant. As the linear-move machine moves forward, the outer docking station will remain engaged and the inner docking station will move along the inner fixed beam and into engagement with the first inner hydrant. The outer docking station will disengage the first outer hydrant and move forward on the fixed outer beam, as the linear-move machine continues to move forward. This "leap-frog" process is repeated as the linear-move machine continues to travel along its path. In this way, no periodic shutdowns of the machine are required.

In all cases, the various operations of the linear-move machine and docking station(s) are controlled by a Programmable Logic Controller (PLC) located on the drive tower of the linear-move machine, operatively connected to a series of solenoids carried by the docking station supporting frame that control the various mechanical movements of the components. The PLC may be electronically "inserted between" the linear-move machine's PLC and the linear-move machine itself to permit seamless integration of the operation of both the linear-move machine and one or more docking stations.

Accordingly, in one aspect, the invention relates to a linear water feed apparatus for use in agricultural irrigation comprising a linear-move machine including a mobile truss assembly supporting a plurality of individual sprinklers and adapted for movement in a specified direction across a field to be irrigated, the truss assembly oriented transverse to the specified direction; a supply pipe arranged in the specified direction along or within the field to be irrigated, the supply pipe mounting a plurality of water supply hydrants at spaced locations along the pipe, each of the hydrants enclosing a water supply valve; and a docking station supported at one end of the truss assembly closest to the supply pipe, and adapted to engage and open successive ones of the water supply valves in the plurality of hydrants, the docking station assembly including a docking station suspended from a first frame for floating movement about at least three mutually perpendicular axes.

In another aspect, the invention relates to a linear water feed for use in agricultural irrigation comprising a linear water feed machine including a wheel-mounted truss assembly supporting a plurality of individual sprinklers and adapted for movement in a specified direction across a field to be irrigated, the truss assembly oriented transverse to the specified direction; a supply pipe arranged in the specified direction along or within the field to be irrigated, the supply pipe mounting a plurality of water supply hydrants at spaced locations along the pipe, each of the hydrants enclosing a water supply valve; and a docking station supported on a first frame that is attached to an end of the truss assembly closest to the supply pipe, adapted to locate, engage and open successive ones of said water supply valves in the plurality of hydrants, the docking station supported for movement on a trolley in a direction substantially transverse to the specified direction, wherein the trolley includes a pair of parallel rails extending beyond the wheeled truss assembly, and further wherein the first frame is provided with plural rollers engaged with each of the parallel rails.

In another aspect, the invention relates to a linear water feed for use in agricultural irrigation comprising a linear water feed machine including a wheel-mounted truss assembly supporting a plurality of individual sprinklers and adapted for movement in a specified direction across a field to be irrigated, the truss assembly oriented transverse to the specified direction; a supply pipe arranged in the specified direction along or within the field to be irrigated, the supply pipe mounting a plurality of water supply hydrants at spaced locations along the pipe, each of the hydrants enclosing a water supply valve; and a docking station supported on a first frame that is attached to an end of the truss assembly closest to the supply pipe, and adapted to engage and open successive ones of the water supply valves in said plurality of hydrants; wherein said docking station is supported at the one end of the truss assembly by means for allowing the docking station to move in up and down, side-to-side and front to back directions, and for allowing the docking station to simultaneously tilt and swivel relative to the first frame.

In still another aspect, the invention relates to a linear water feed apparatus for use in agricultural irrigation comprising a linear-move machine including a mobile truss assembly supporting a plurality of individual sprinklers and adapted for movement in a specified direction across a field to be irrigated, the truss assembly oriented transverse to the specified direction; a supply pipe arranged in the specified direction along or within the field to be irrigated, the supply pipe mounting a plurality of water supply hydrants at spaced locations along the pipe, each of the hydrants enclosing a water supply valve; and a fixed side beam mounted on one end of the truss assembly closest to the supply pipe extending substantially parallel to the supply pipe; a telescoping arm mounted on the fixed side beam for movement in two opposite and parallel directions relative to the fixed side beam; a docking station including a support frame mounted on the telescoping arm for movement along the telescoping arm in the two opposite directions; the docking station resiliently suspended from the supporting frame for vertical, horizontal and compound movements.

In still another aspect, the invention relates to a linear water feed apparatus for use in agricultural irrigation comprising a linear-move machine including a mobile truss assembly supporting a plurality of individual sprinklers and adapted for movement in a specified direction across a field to be irrigated, the truss assembly oriented transverse to the specified direction; a supply pipe arranged in the specified direction along or within the field to be irrigated, the supply pipe mounting a plurality of water supply hydrants at spaced locations along the pipe, the hydrants alternately offset in opposite transverse directions from the supply pipe, each of the hydrants enclosing a water supply valve; and a pair of laterally spaced, inner and outer beams fixed to a side of the truss assembly closest to the water supply pipe; a docking station including a supporting frame mounted on each of the pair of laterally-spaced inner and outer beams, each docking station having a hydrant valve actuator in fluid communication with a distribution pipe in the truss assembly, wherein the docking station on the inner beam is adapted to engage hydrants offset in one direction from the supply pipe, and the docking station on the outer beam adapted to engage hydrants offset in the opposite direction from the supply pipe.

The invention will now be described in more detail in connection with the drawings identified below.

DETAILED DESCRIPTION OF THE INVENTION

Figure 1:
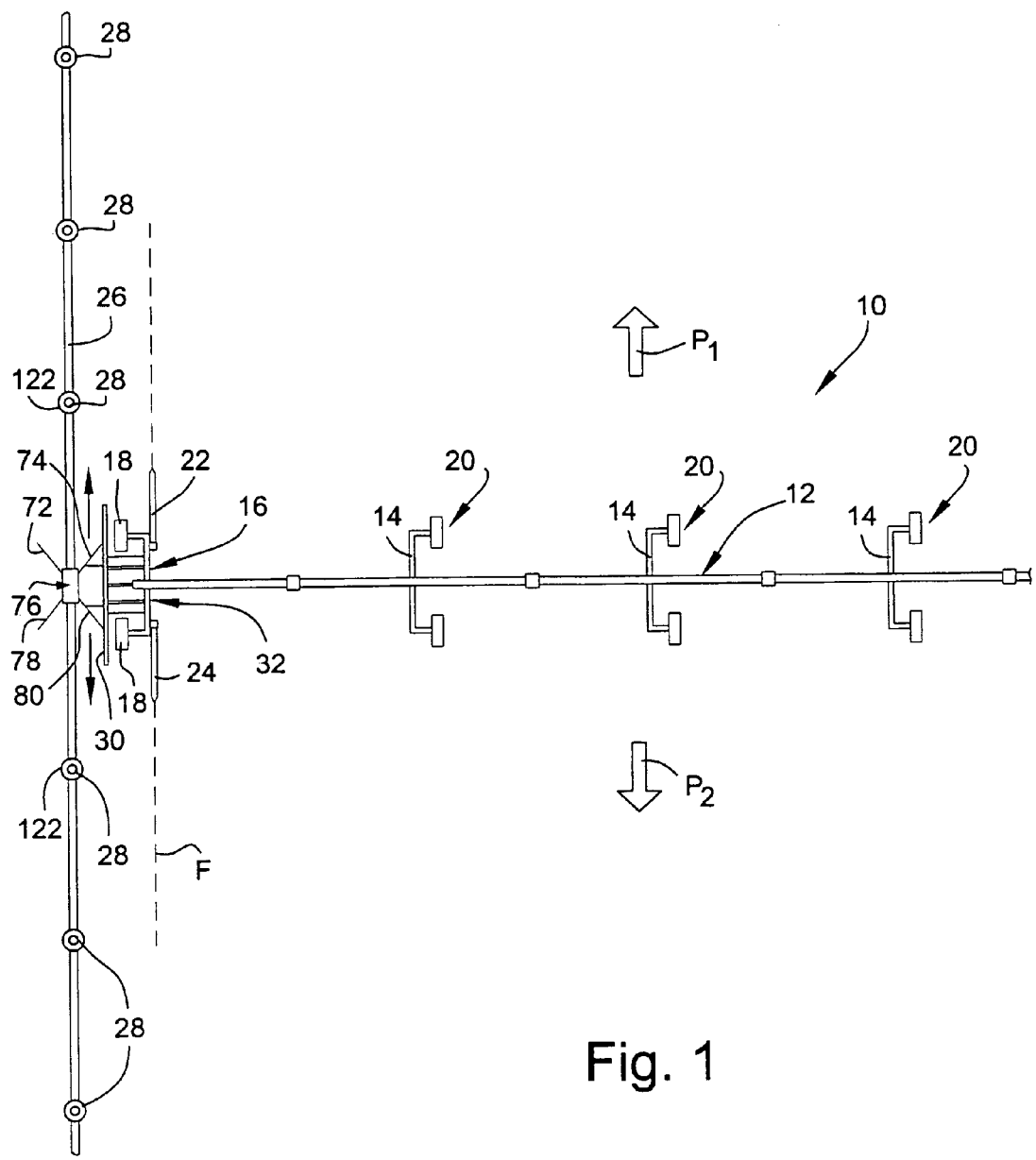
FIG. 1 is a schematic plan view of a linear-move machine incorporating a docking station in accordance with the subject invention.
Figure 2:
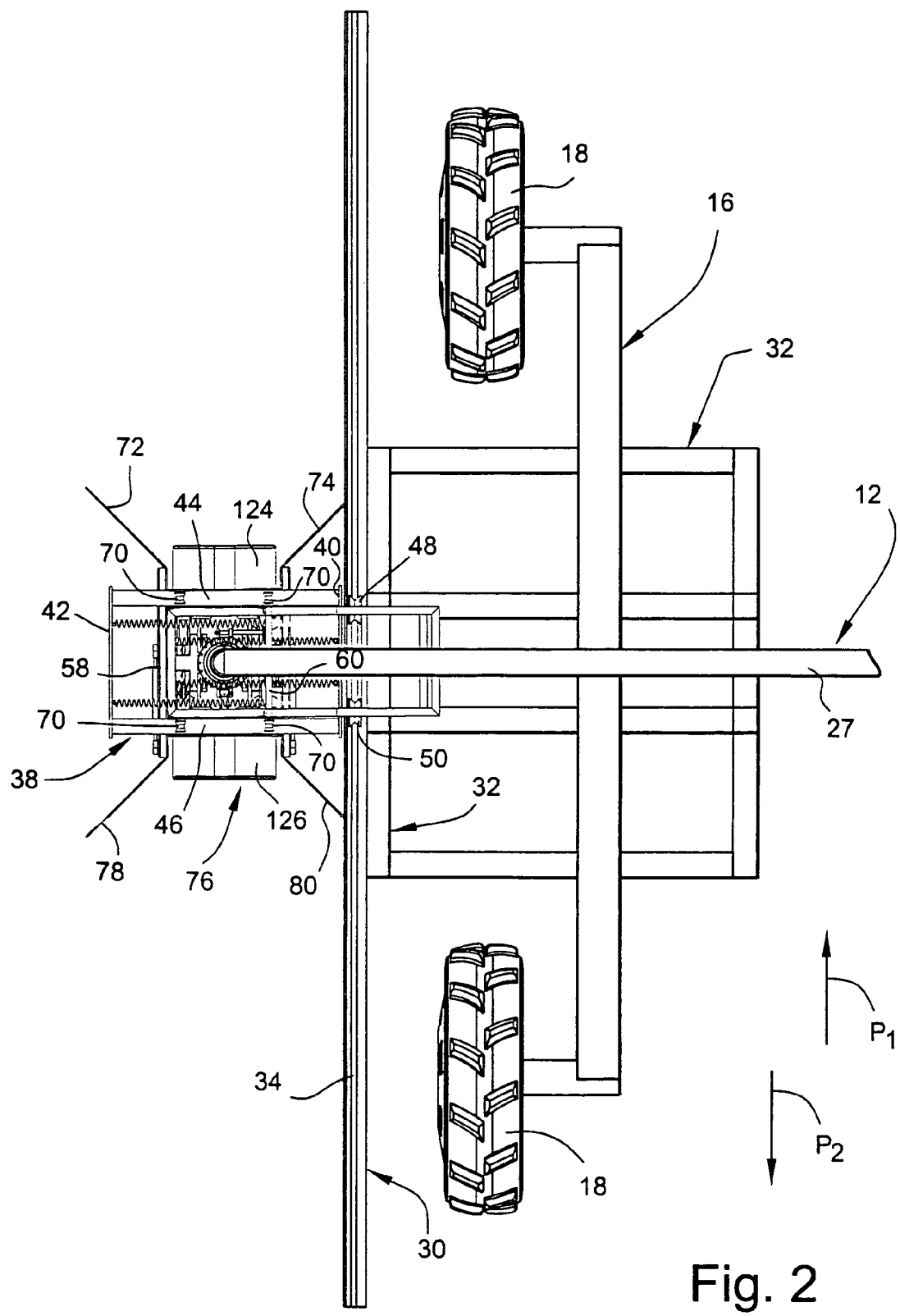
FIG. 2 is an enlarged plan view, primarily in schematic form, illustrating the docking station mounted to the side of an end tower of the linear-move machine illustrated in FIG. 1.
Figure 3:
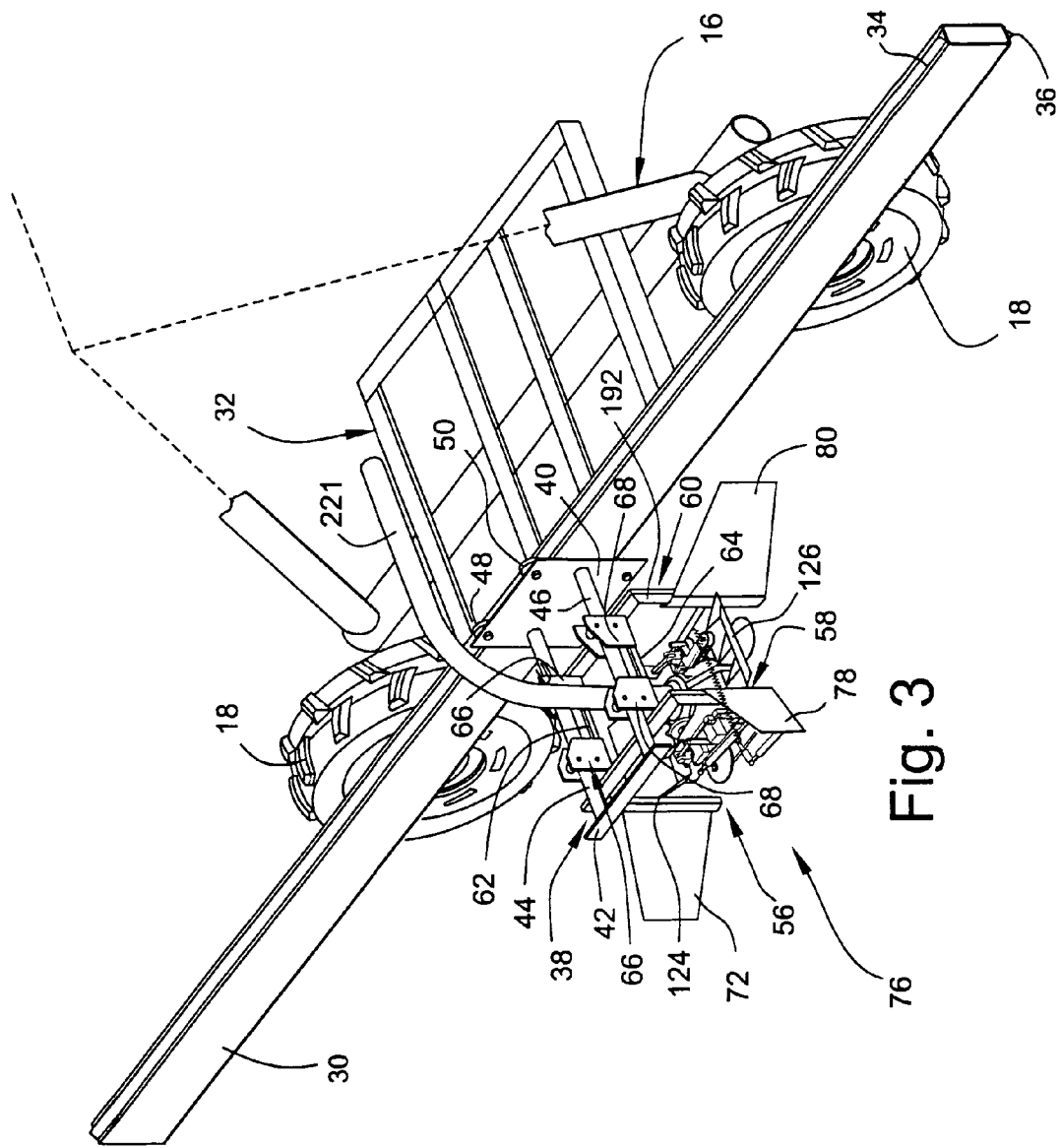
FIG. 3 is a perspective view of the docking station and end tower of the linear-move machine shown in FIG. 2.

With reference initially to FIG. 1, a typical linear-move irrigation machine 10 includes a main truss assembly 12 supported by several wheeled towers 14 for movement in a forward direction along a linear path $P_1$, or in a rearward direction along an opposite path $P_2$. These paths extend perpendicularly to the truss assembly 12, and parallel to a water supply pipe 26. A drive tower 16 typically supports a generator (not shown) for supplying power to the drive wheels 18. In an end-feed arrangement, the drive tower is located at one end of the field, and the supply pipe 26 runs along that end of the field. In a center-feed machine, the drive tower is typically located in the center of the field and the supply pipe also runs through the center of the field. Separate electric motors (also not shown) are often attached to the remaining towers 14 for driving the respective wheel pairs 20 as needed to maintain alignment with the end tower 16 and associated drive wheels 18. Other drive arrangements including the utilization of battery power and/or electric drive motors connected to a power source by a cable could be employed.

Guide booms 22, 24 extend in opposite directions from the end tower 16 (parallel to the paths $P_1$ and $P_2$), and are engaged in a guide furrow F adjacent and parallel to the supply pipe 26 to thereby guide and maintain the machine in the desired path. Typically, if the guide booms stray laterally from the furrow beyond a predetermined limit, the machine will shut down. Other guide arrangements including the use of electronic and/or optical sensors, wire, GPS, etc. may be utilized as well.

Figure 4:
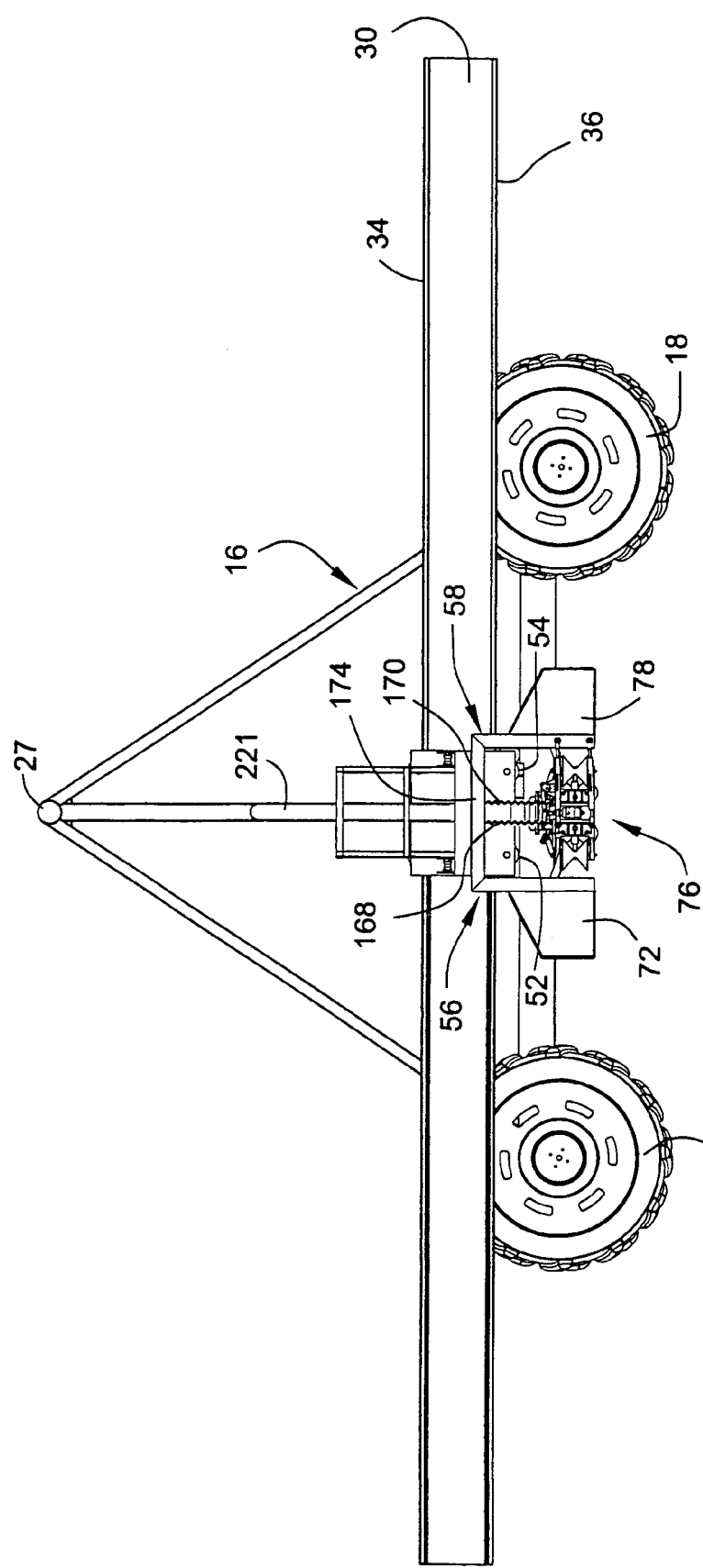
FIG. 4 is a left side elevation of the apparatus shown in FIG. 2.
Figure 5:
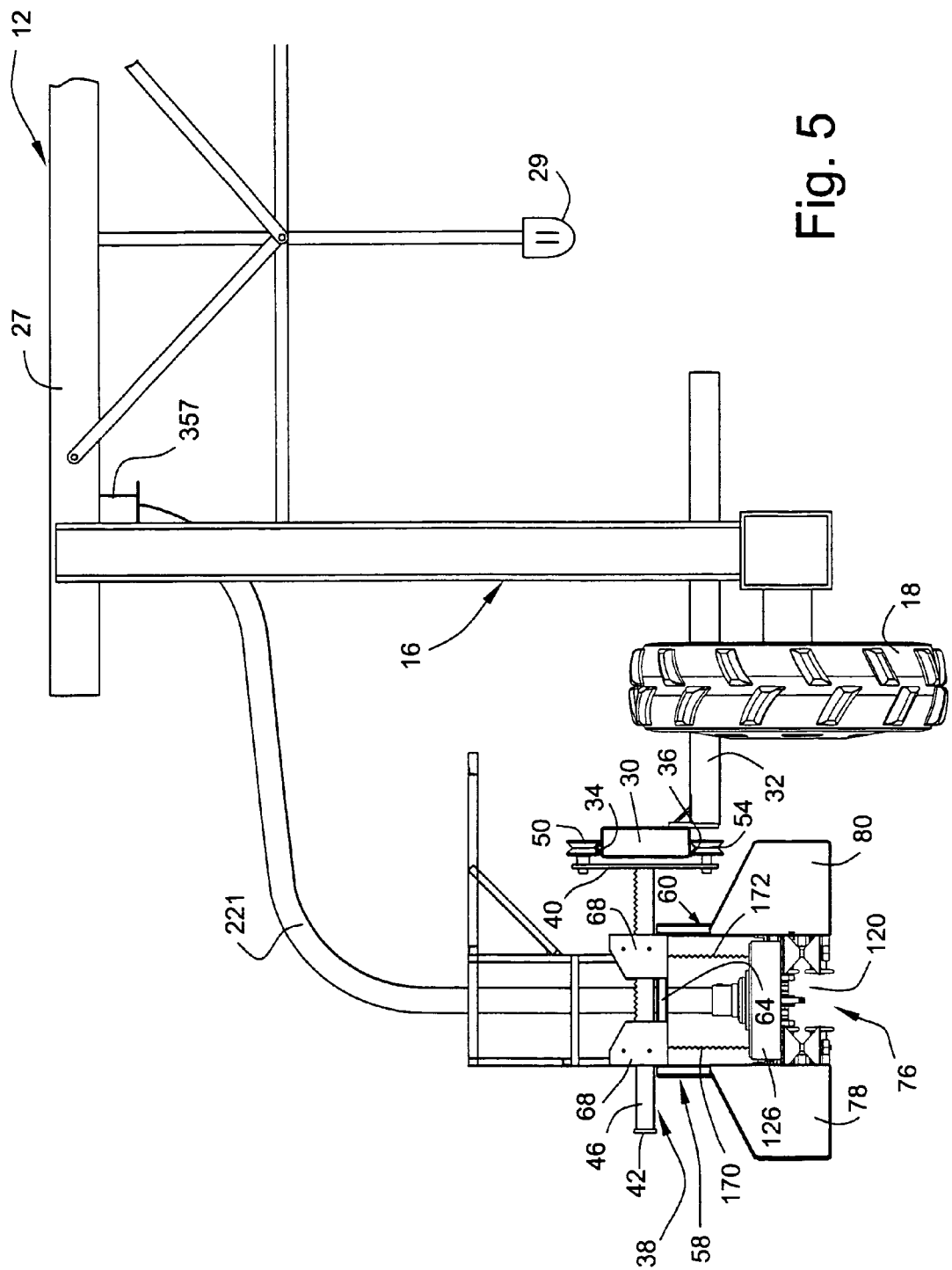
FIG. 5 is a front elevation of the apparatus shown in FIGS. 2-4.

The water supply pipe 26 is fitted with spaced hydrants 28 that supply water to the machine 10 for distribution through a distribution pipe 27 (see FIGS. 4 and 5) on the truss assembly and ultimately to the sprinklers (one shown at 29 in FIG. 5) suspended from the boom assembly 12, at spaced locations therealong. The supply pipe 26 is shown above ground, but may be underground, with only the hydrants 28 visible. The linear-move machine 10 as described is generally well-known, and this invention relates primarily to the manner in which the linear-move machine 10 engages and disengages the hydrants 28.

In connection with the further description of the docking station and related hardware, the various drawing figures have been simplified via omission of details for the sake of clarity and ease of understanding. For example, in some views, certain structure not necessary for understanding the text relating to these views has been omitted. In addition, wiring and other minor details that would otherwise clutter the drawings, but that are nevertheless well understood by those of ordinary skill in the art, have also been omitted from various figures.

In an exemplary embodiment, and with specific reference to FIGS. 2 through 7, a rigid side beam 30 is bolted or welded (or otherwise suitably secured) to an existing frame 32 of the drive tower 16, such that the beam extends substantially parallel to the water supply pipe 26, and to the direction of movement of the linear-move machine. Side beam 30 may be, for example, a solid or hollow box-beam, but in any event, the beam is provided with inverted V-shaped rails 34, 36 (best seen in FIGS. 3, 4 and 5) along upper and lower edges of the beam, running substantially the entire length of the beam.

A docking station assembly in accordance with one embodiment of the invention, includes a trolley, a supporting frame and the docking station itself. The trolley 38 includes a pair of metal plates 40, 42 connected by a pair of, e.g., 2 in. dia. pipes 44, 46 (or other suitably rigid members) extending laterally away from the side beam 30. The larger plate 40 is located adjacent the side beam, and mounts an upper pair of rollers 48, 50 and a lower pair of rollers 52, 54 (FIGS. 5 and 6) that permit the trolley 38 to roll along the rails 34, 36 of the side beam 30 to any desired location along the length of the side beam. Simple pins or bolts (not shown) in combination with holes in the beam (or any other suitable mechanical, hydraulic, pneumatic or electric locking device), provide a reliable locking arrangement for securing the trolley, and hence the docking station, at desired locations along the side beam 30.

Figure 6:
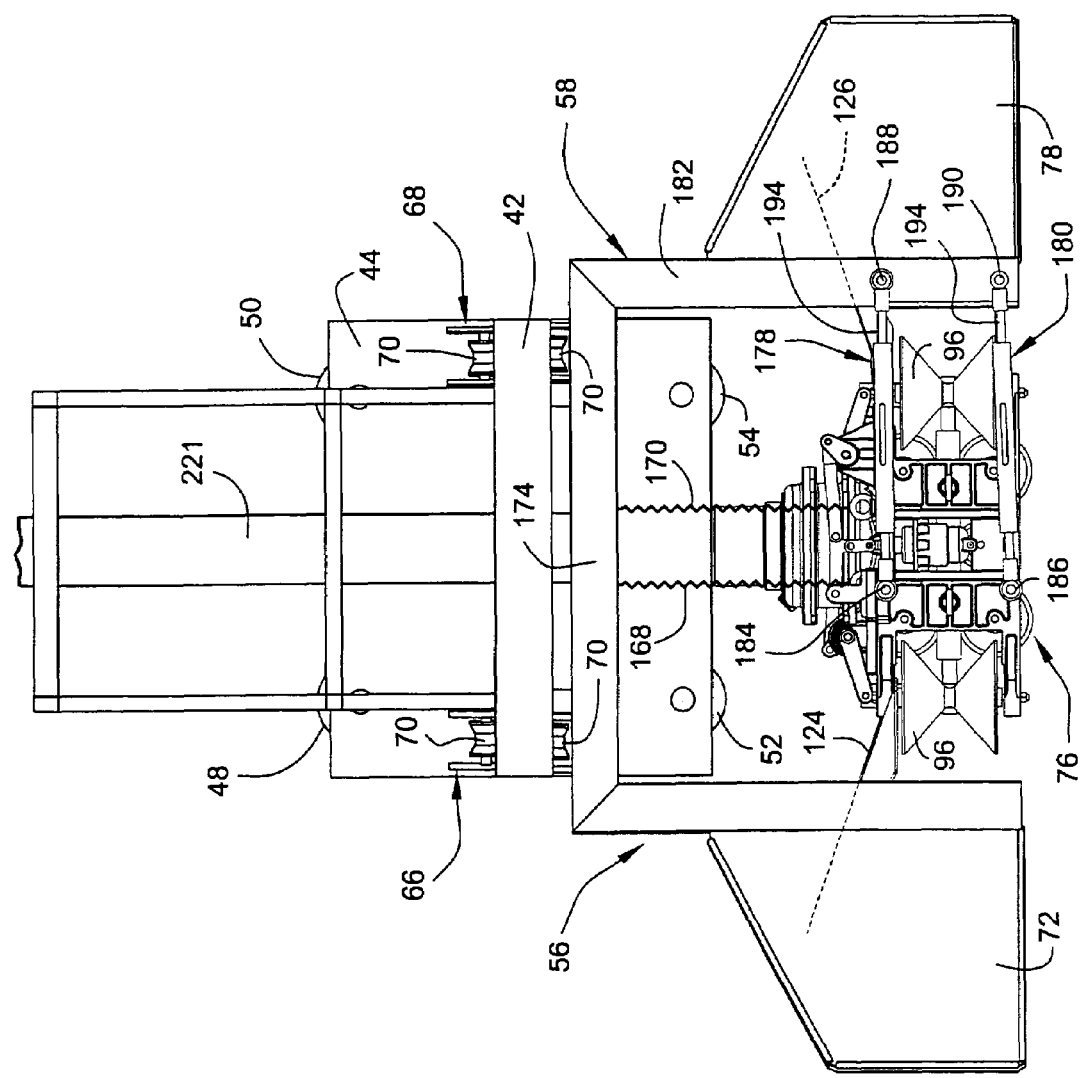
FIG. 6 is an enlarged side elevation of the docking station taken from FIG. 4.
Figure 7:
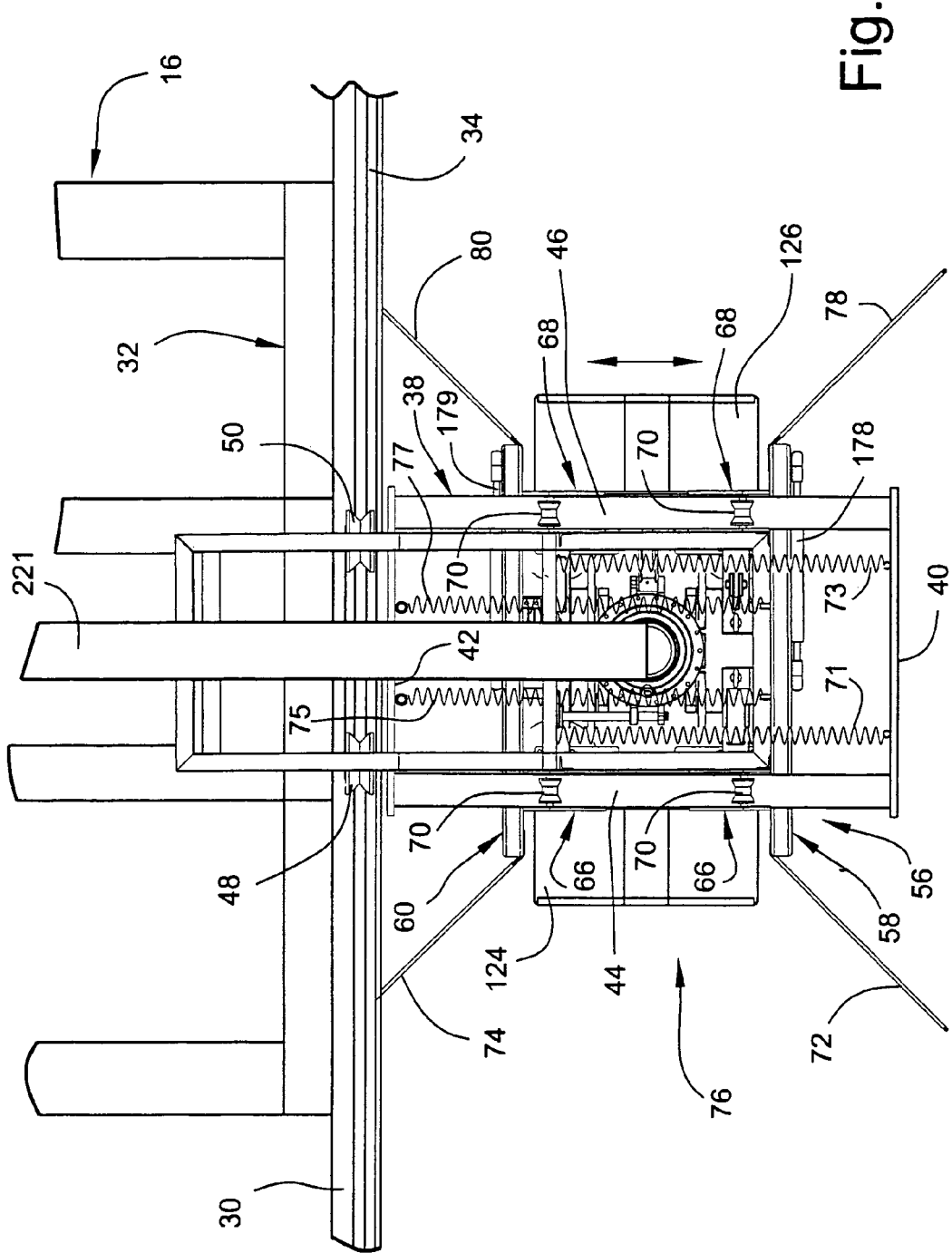
FIG. 7 is an enlarged detail of the docking station in plan view, as shown in FIG. 2.
Figure 11:
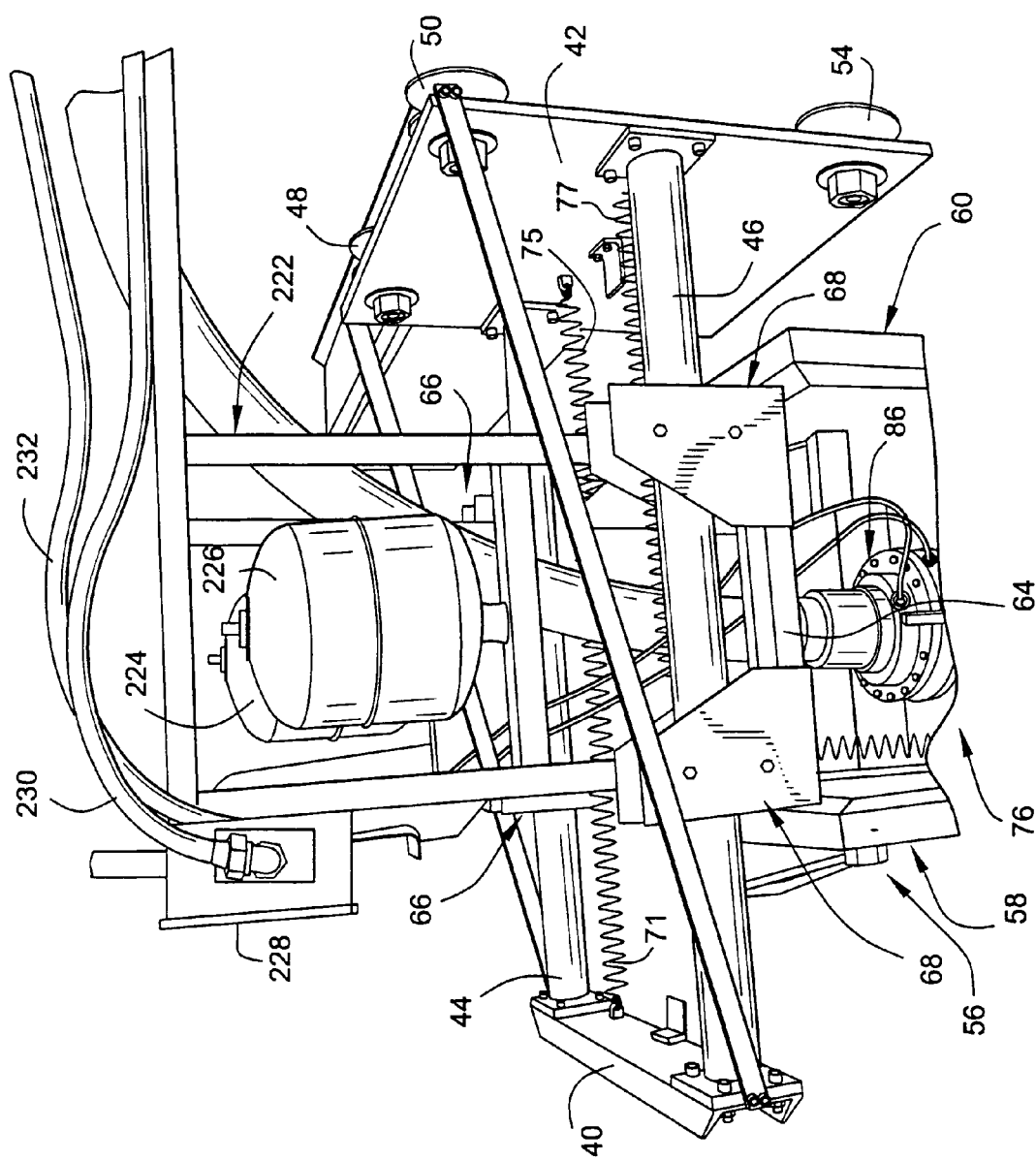
FIG. 11 is a partial perspective view of an upper portion of the docking station shown in FIGS. 1-7, including the docking station trolley and supporting frame.
Figure 12:
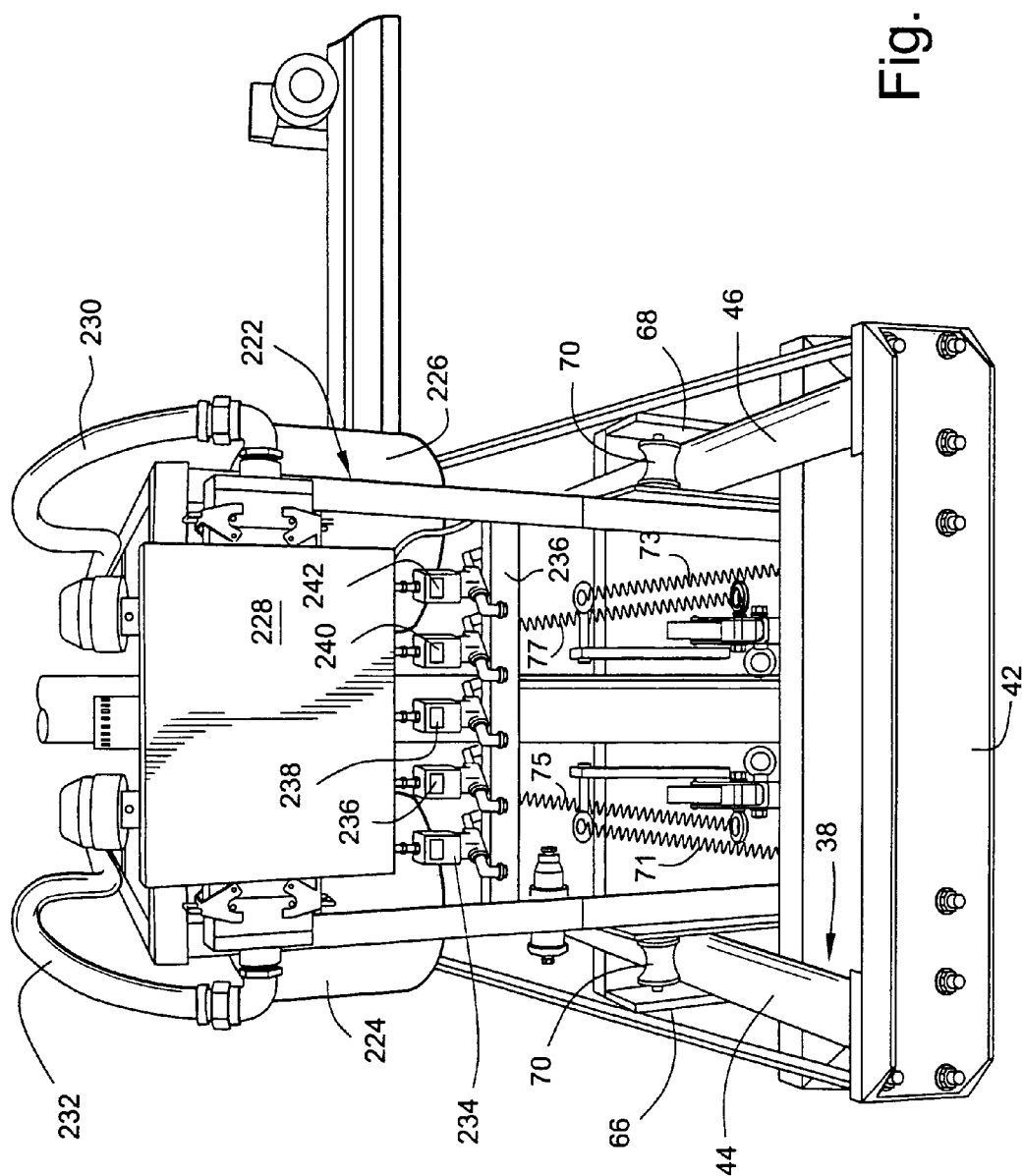
FIG. 12 is a perspective view similar to FIG. 11, but rotated 90°.

With reference especially to FIGS. 3, 6, 7, 11 and 12, the docking station supporting frame 56 is carried on the trolley 38 and includes a pair of inverted U-shaped subassemblies 58, 60 that are connected at their upper ends by frame members 62, 64 (FIGS. 3 and 5) and two pairs of roller mounting flanges 66, 68 (FIGS. 3, 6, 7 and 12), each flange pair mounting two rollers 70 such that the supporting frame 56 is movable laterally, in a direction perpendicular to the paths $P_1$ and $P_2$ (FIG. 1), along the trolley pipes or rails 44, 46 between plates 40, 42. This arrangement provides a lateral adjustment feature for the docking station 76 relative to the side beam 30 as described further herein. As best seen in FIGS. 7, 11 and 12, a pair of horizontally oriented coil springs 71, 73 are connected between the outer plate 40 and the inner U-shaped subassembly 60, while a second pair of horizontally-oriented coil springs 75, 77 extend between the inner plate 42 and the outer U-shaped subassembly 58. This arrangement maintains the docking station 76 (described below) in a generally centered position along the trolley rails 44, 46 (between plates 40 and 42), but also permits reciprocatory spring-biased movement of the docking station 76 in opposite directions along the rails. Thus, the docking station 76 is able to accommodate various degrees of misalignment of any one or more of the hydrants 28. Lateral movement of the docking station 76 to enable capture of a misaligned hydrant is also enabled by front and rear pairs of substantially vertical guide wings. Specifically, a forward pair of guide wings 72, 74 is fixed to respective forward ends of subassemblies 58, 60 and extend forwardly of the docking station 76, flaring outwardly in the forward direction. A rearward pair of guide wings 78, 80 is fixed to respective rearward ends of subassemblies 58, 60 and extend rearwardly of the docking station 76, also flaring outwardly but in the rearward direction. The role played by the guide wings 72, 74 and 78, 80 in assisting the capture of the hydrant flange is explained further below.

Figure 8:
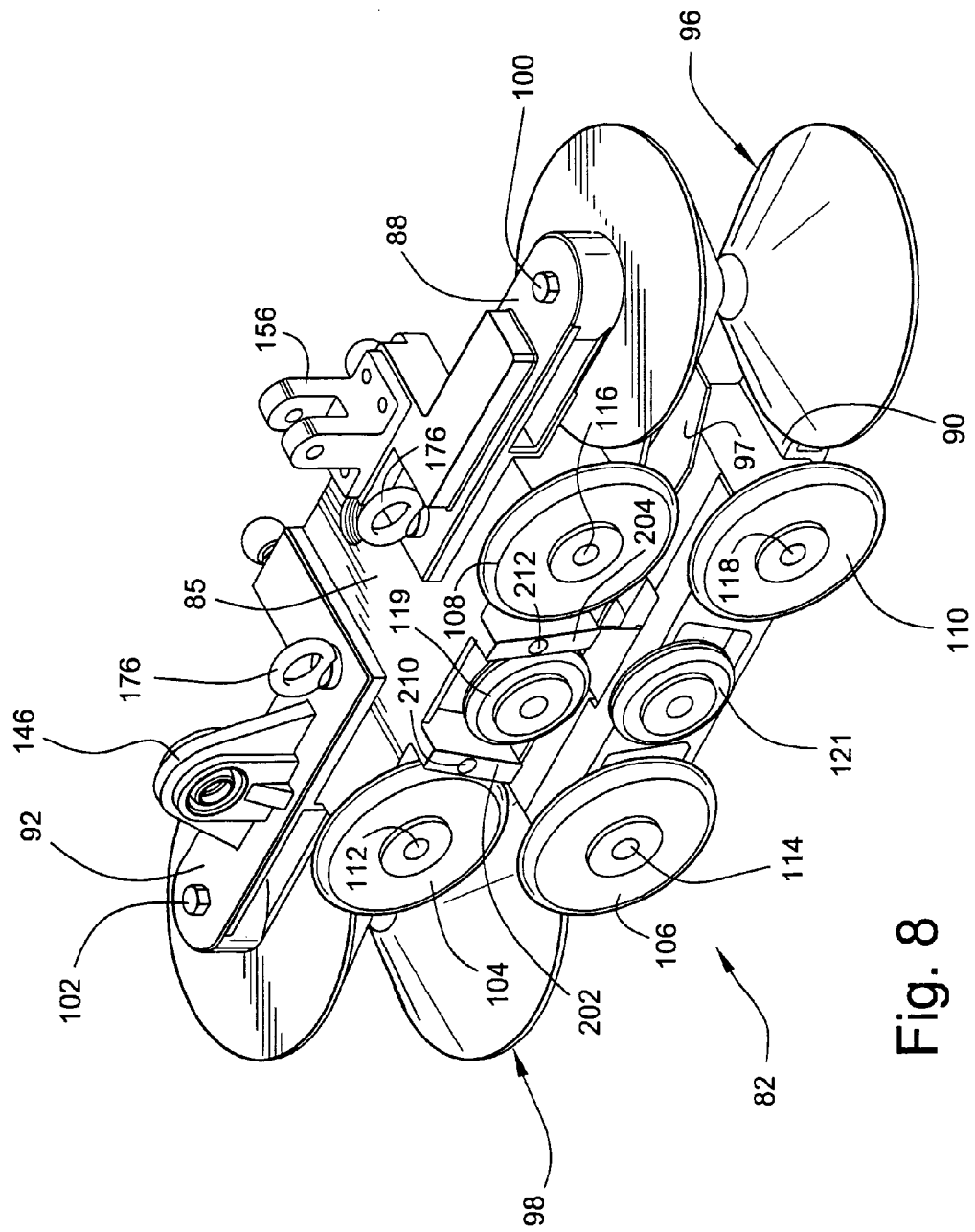
FIG. 8 is a perspective view of one of two docking station housings incorporated in the docking station shown in FIGS. 1-7.
Figure 9:
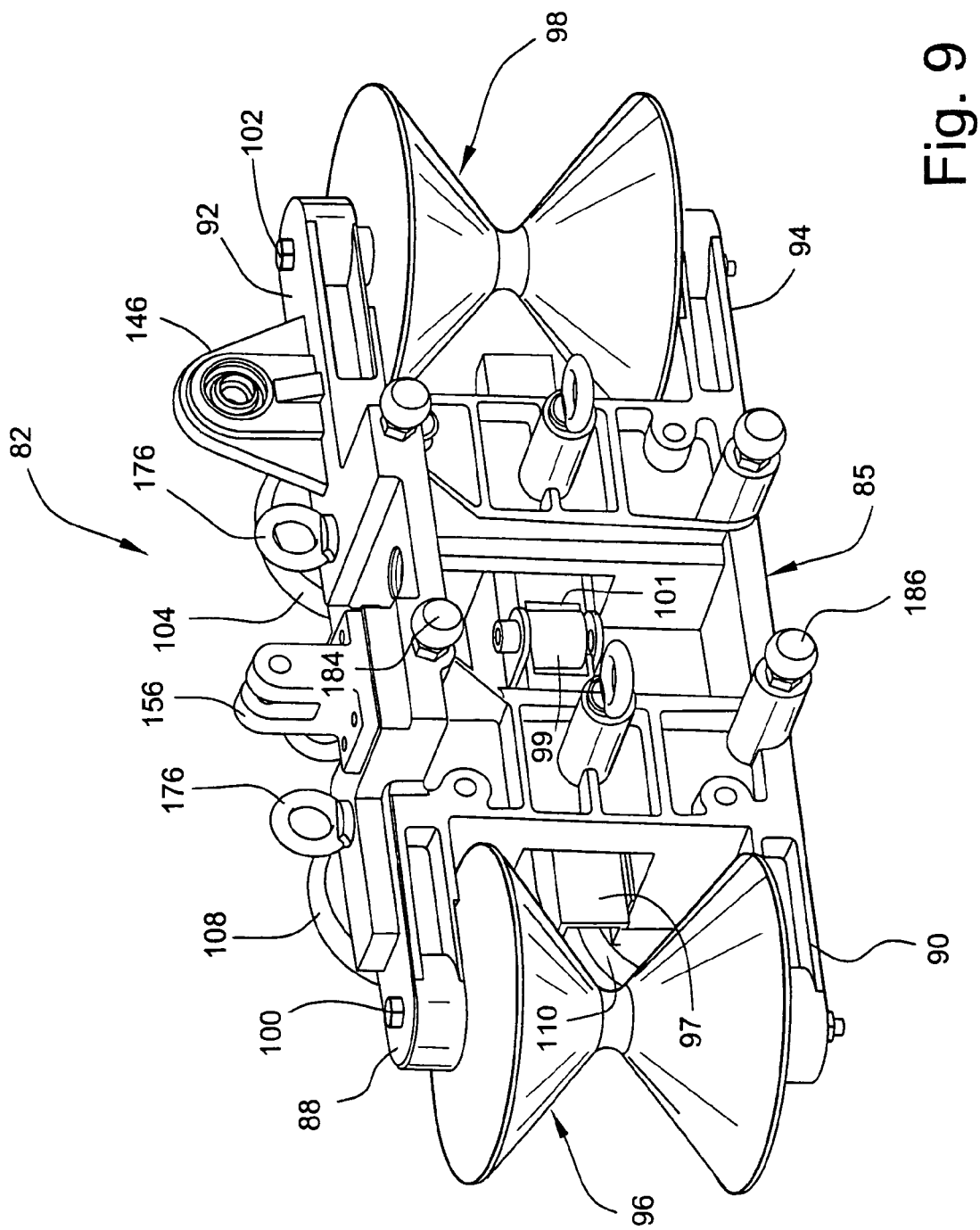
FIG. 9 is a perspective view taken from the opposite side of the docking station housing shown in FIG. 8.
Figure 10:
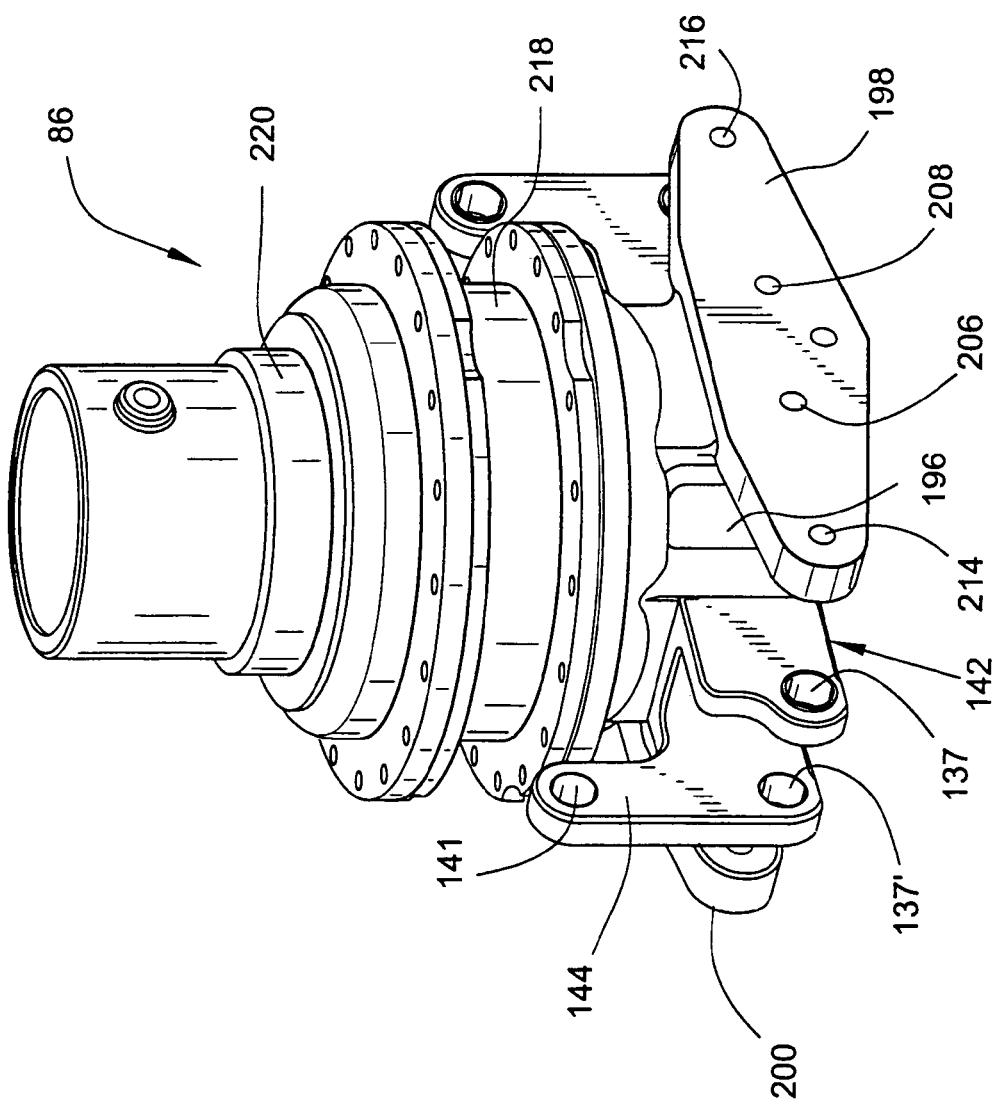
FIG. 10 is a perspective view of the hydrant valve actuator incorporated in the docking station in FIGS. 1-7.

The docking station itself, indicated at 76, includes a pair of housings 82, 84 (one shown in FIGS. 8, 9) on either side of, i.e., sandwiched about, a hydrant valve actuator assembly 86 (FIG. 10). Since the housings 82, 84 are identical to one another, only one need be described in detail. As best seen in FIG. 8 (exterior side) and FIG. 9 (interior side), housing 82 includes a main body portion 85 with two pairs of oppositely directed flanges 88, 90 and 92, 94, each flange pair supporting between them a respective generally hourglass-shaped V-track roller 96, 98 for rotation about a vertical axis defined by pivot pins or bolts 100, 102. The main body portion 85 of housing 82 also supports two pair of vertically aligned guide wheels 104, 106 and 108, 110 for rotation about horizontal axes indicated by bolt or pivot pin holes 112, 114, 116 and 118, respectively. The pairs of guide wheels are supported axially between the V-track rollers 96, 98, on the inner side of the housing 82. An additional pair of idler rollers 119, 121 may be mounted on each housing, but they are merely optional, not required. An open channel member 97 is fixed to the inner side of the housing 82, vertically centered between the guide wheels 104, 106, 108 and 110. The open side of the channel faces inwardly, creating a slot that receives one side of the hydrant flange 122. A vertically mounted side guide roller 99 is fixed to the housing and partially protrudes through an aperture 101 in the housing for engagement with the flange 122. Thus, when housings 82, 84 are assembled on either side of the valve actuator assembly 86, a passageway or docking space 120 is defined by the two laterally opposed pairs of V-track rollers 96, 98 at the front and back of the docking station, the channel members 97 and the two pairs of laterally opposed guide wheels (104, 106) and (108, 110) located axially between the two pairs of V-track rollers on each housing 82, 84. This passageway 120 (best seen in FIGS. 5 and 15) is located below the hydrant valve actuator 86, and is sized and shaped to receive the flange 122 (FIGS. 1, 14, 15 and 17-20) on the hydrant 28 as also described further below.

Figure 13:
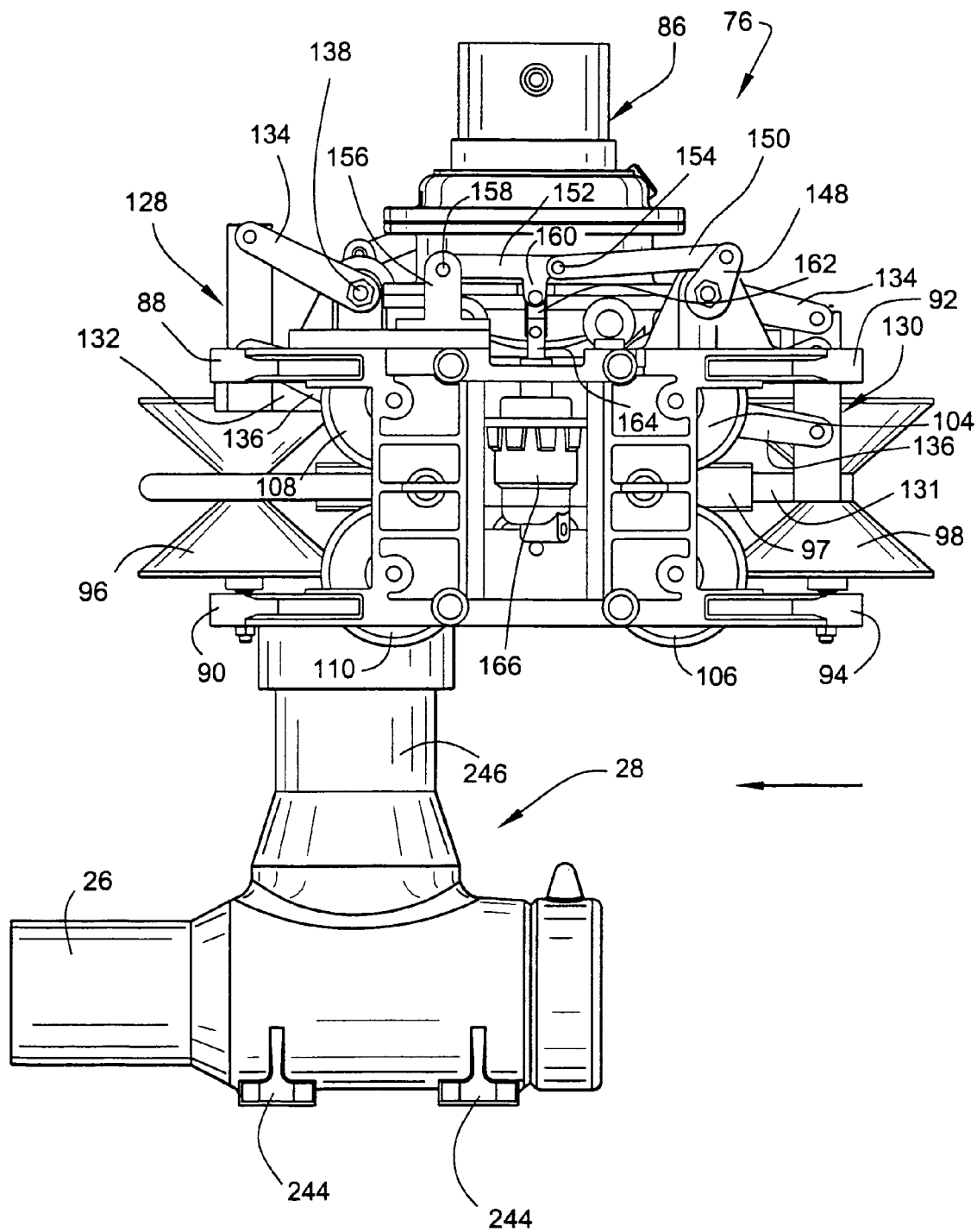
FIG. 13 is a partial simplified side elevation of the docking station when in initial engagement with a hydrant.
Figure 14:
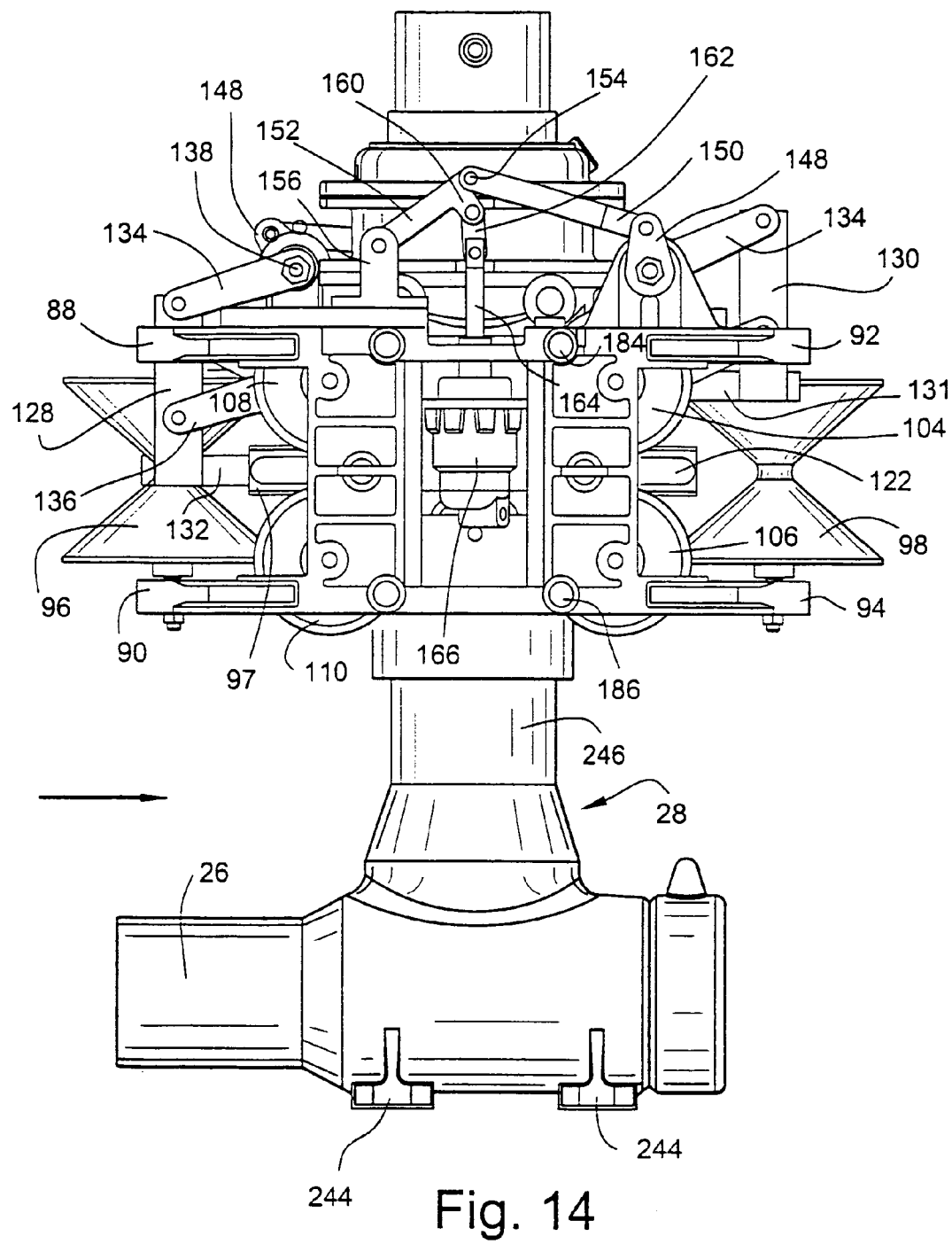
FIG. 14 is a view similar to FIG. 13 but directionally reversed and with the hydrant fully engaged and aligned within the docking station.
Figure 15:
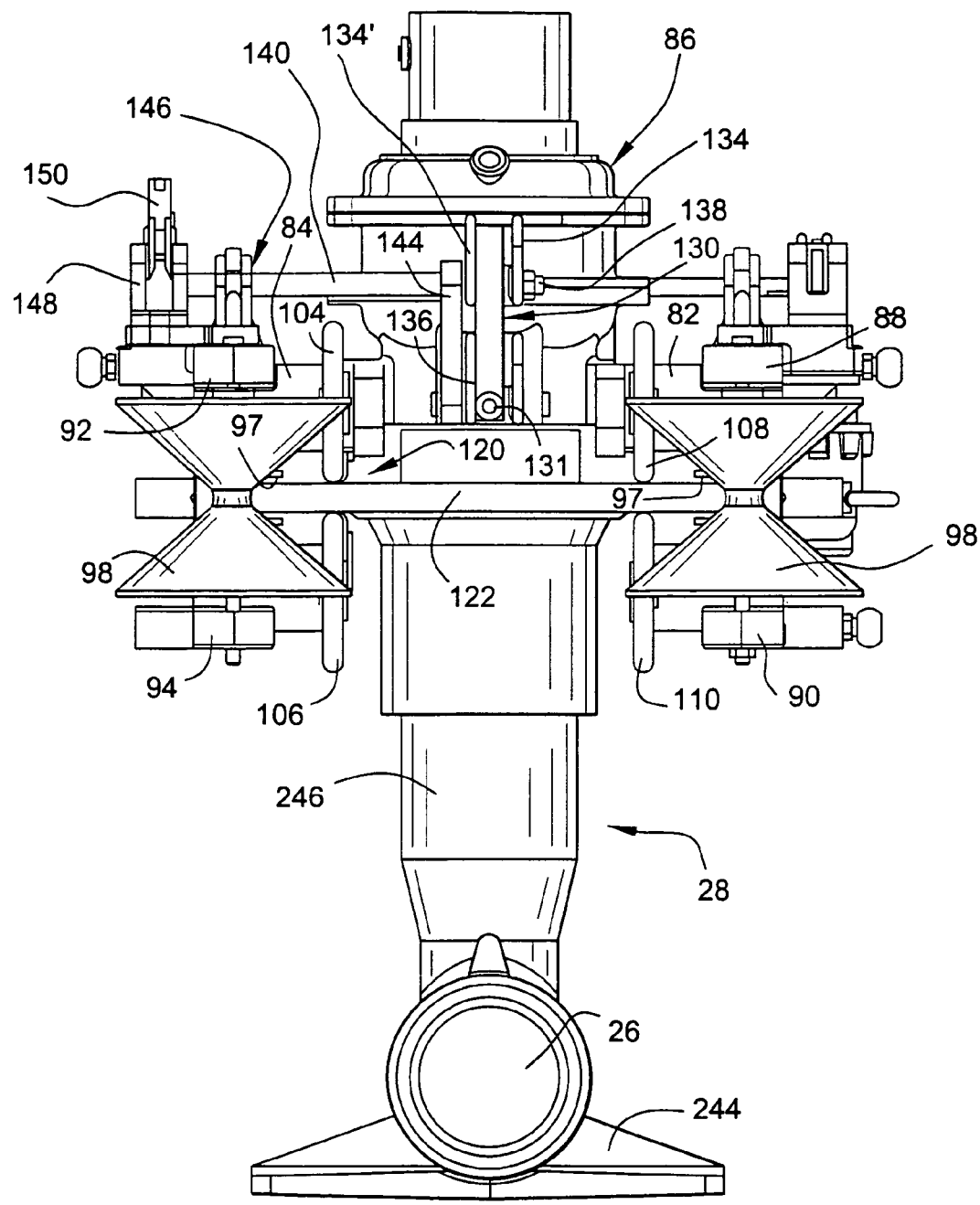
FIG. 15 is a rear elevation view of the docking station and hydrant as shown in FIG. 13, with the hydrant fully engaged within the docking station.
Figure 16:
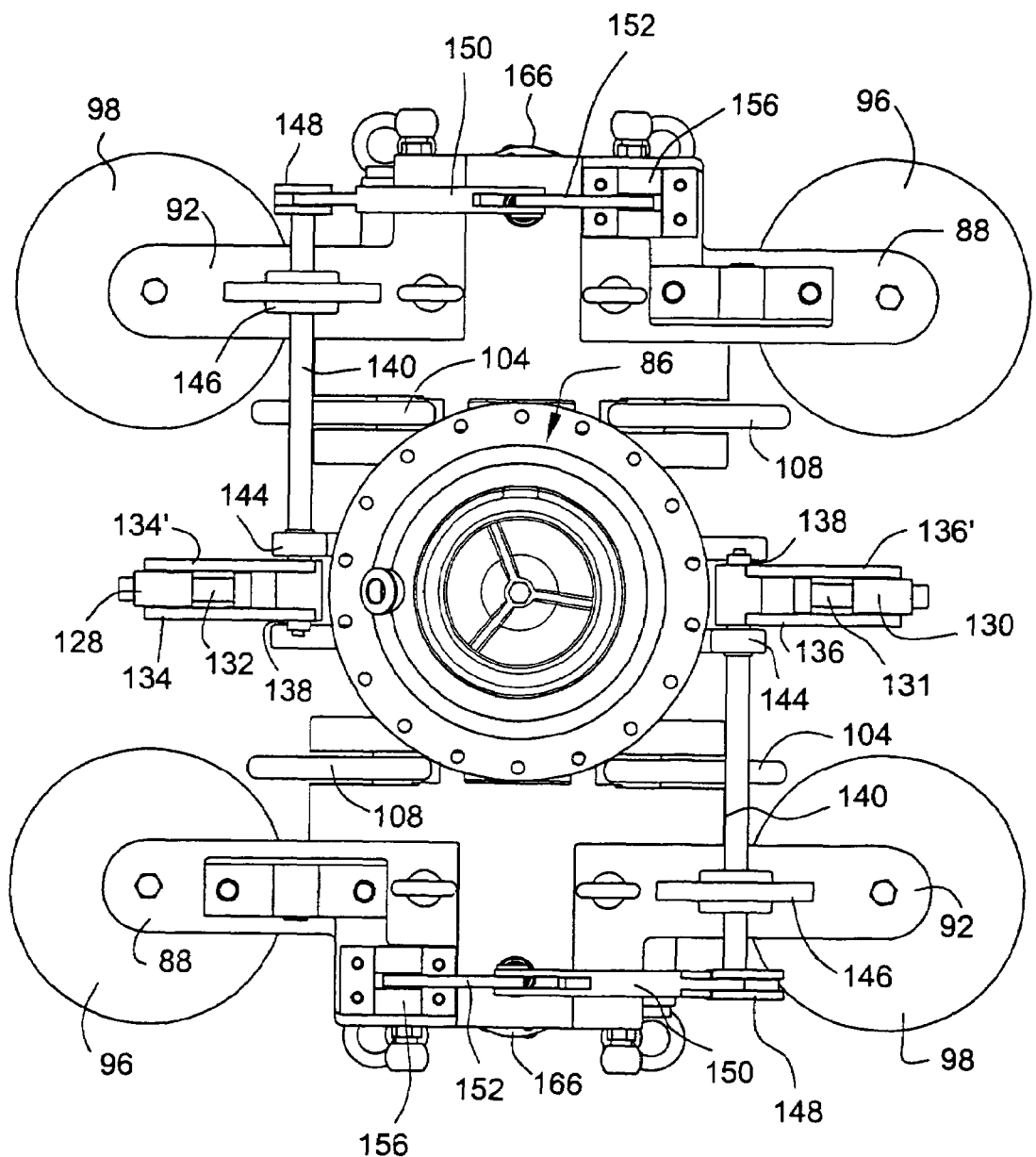
FIG. 16 is a simplified plan view of the docking station, with vertical and horizontal guide wings and suspension components removed.

Also fixed to the housings 82, 84 are a pair of substantially horizontally-oriented guide wings 124, 126 (FIGS. 2, 3, 5, 6 and 7). The guide wings 124 and 126 are secured to the housings 82, 84 by means of bolts, welding or any other suitable means. Wing 124 projects outwardly and upwardly in a forward direction, while wing 126 projects outwardly and upwardly in a rearward direction. These wings work in concert with guide wings 72, 74 and 78, 80 to align the docking station 76 with the hydrants 28. The vertically-oriented wing pairs 72, 74 and 78, 80 are designed to be engaged by the hydrant flange 122 when the hydrant is misaligned in a lateral direction, causing the docking station 76 to move laterally along the trolley rails 44, 46 in a direction dependent upon which of the guide wings is engaged. The horizontally-oriented wings 124, 126 are especially designed to assist in adjustment of the docking station 76 to a hydrant 28 that is slightly higher than a desired optimum height, i.e., when the flange 122 is higher than the passageway or docking space 120. Thus, when wing 124, for example, engages a hydrant flange 122, it will cause the docking station to crawl upwardly over the flange 122 so that the flange can be engaged by one or more of the V-track rollers 96, 98. The V-track rollers 96, 98 will also cam the docking station 76 in a direction that brings the docking station to a position where the flange 122 is located in the center of the V-track rollers 96, 98 as best seen in FIGS. 13-15. Note that the profile at the narrow center of the V-track rollers 96, 98 complement the rounded profile of the peripheral edge of the flange.

With reference especially to FIGS. 13-16, the housings 82, 84 and valve actuator assembly 86 of the docking station 76 also support a pair of dock stops 128, 130 on the forward and rearward ends, respectively, of the docking station. The rearward stop 130 is controlled by a similar linkage and actuator arrangement as forward stop 128, but is supported on the opposite side of the docking station 76. Note that the forward and rearward stops and their associated linkage and drives are identical, with an actuator 166 mounted on each side of the docking station 76, i.e., one actuator 166 is mounted on the housing 82 and the other actuator 166 is mounted on the housing 84. For convenience and clarity, and with the exception of stops 128, 130, the links, shafts and bearing supports for each stop have the same respective reference numerals. Thus, the description of stop 128 below applies equally as well to stop 130. In addition, note that the direction of movement in FIG. 13 is reversed in FIG. 14 to enable a clear illustration of the stops 128 and 130 in both retracted and extended positions. Note also that in FIGS. 13, 14 and 20, one of the open channel members 97 (nearest the viewer) has been omitted to more clearly show the flange 122 within the opposite channel member.

The forward stop 128 is in the form of a vertically-oriented bar combined with a horizontally-oriented proximity sensor 132 at its lower end. The proximity sensor for stop 130 is indicated at 131. The stop 128 is pivotally supported by two sets of parallel links 134, 134' and 136, 136'. The upper set 134, 134' is pivotally attached at a forward end to the upper end of stop 128 via a pivot pin, and at a rearward end to end 138 of a shaft 140. The lower set of links 136, 136' is pivotally attached at a forward end to the lower end of the stop 128 and at a rearward end to a clevis 142 (FIG. 10) secured to the lower housing 196 of the valve actuator assembly 86. In this regard, the pivot pin or bolt (not shown) extends through holes 137, 137' in the clevis. This parallel linkage arrangement allows the stop 128 to move essentially vertically up and down between raised (go) and lowered (stop) positions upon rotation of shaft 140, as shown, respectively, in FIGS. 13 and 14.

Figure 17:
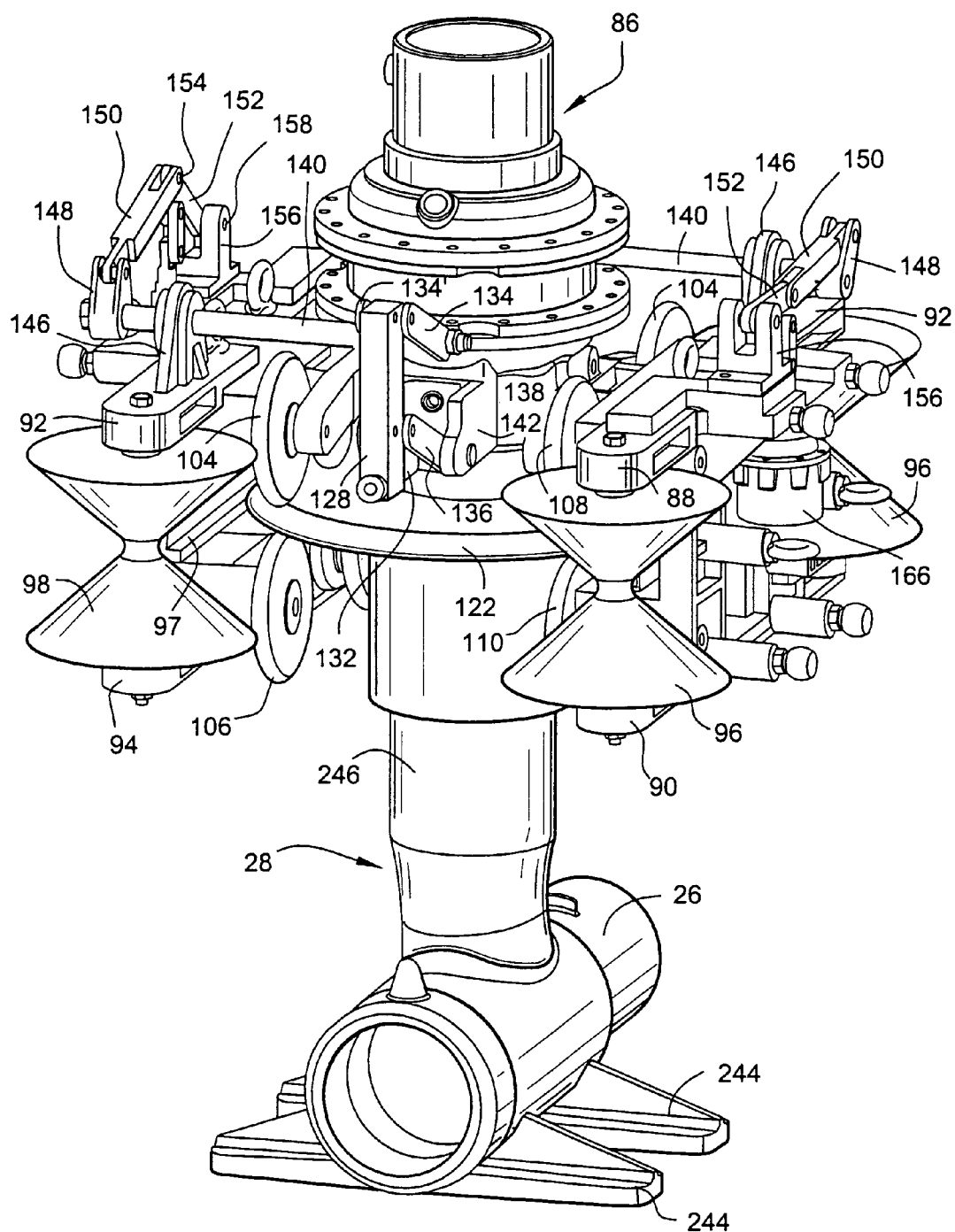
FIG. 17 is a right front perspective view of the docking station and hydrant shown in FIG. 15.

Shaft 140 is supported within a journal bearing 141 in an extended side 144 of the clevis 142, and in a bearing stand 146 on the housing 82. The free end of the shaft 140 adjacent the stand 146 mounts a clevis 148 for pivoting movement upon rotation of the shaft. A forward end of an adjustable link arm 150 is pivotally mounted within the free end of the clevis 148. The rearward end of the link arm 150 is pinned to a forward end of a second link arm 152 via pin 154 (FIGS. 14 and 17). The rearward end of the second link arm 152 is pivotally mounted in a clevis 156 (via pin 158) also supported on the housing. Adjacent the forward end of the second link arm (i.e., adjacent pin 154), a right angle arm 160 (FIG. 14) is pivotally attached to a rigid connecting link 162 fixed to an output shaft 164 of one of the hydraulic actuators 166. When the shaft 164 is extended, link 152 will pivot in a counter-clockwise direction, thereby pulling the first link 150 upwardly and rearwardly. This movement causes the clevis 148 and thus shaft 140 to rotate in a counter-clockwise direction. As a result, the parallel linkage comprised of link sets 134, 134' and 136, 136' will also rotate in the same direction, raising the stop 128 (or 130) to a retracted or "go" position. Retraction of actuator shaft 164 will have the opposite effect, i.e., lowering the stop 128 (or stop 130) to an extended or "stop" position.

The docking station 76 itself is suspended or hung from the supporting frame 56 so as to allow the docking station to "float" to a limited extent in essentially any direction to facilitate capture of the hydrant. Specifically, and with reference again to FIGS. 4-6, the docking station 76 is resiliently suspended from its supporting frame 56 by means of four coil springs (three shown at 168, 170 and 172 in FIGS. 4-6) extending vertically between eyebolts (or other suitable points of attachment) secured to the inside surfaces of the horizontal members 174 of the inverted U-shaped subassemblies 58, 60 and eyebolts (or similar) 176 on respective upper surfaces of housings 82 and 84. In the exemplary embodiment, one pair of springs is attached to the top of housing 82, and the other pair of springs is attached to the top of housing 84, such that the four coil springs are arranged in a generally rectangular pattern. These springs permit spring-biased up and down movement of the docking station, and also permit limited side-to-side, front-to-back, and compound movements, i.e., tilting and twisting movements.

A first pair of spring-loaded, compressible tie rods 178, 180 (FIG. 6) is secured substantially horizontally between the rearward vertical member 182 of the U-frame subassembly 58, and the housing 82 via mounting bushings 184, 186 (see also FIG. 9) and 188, 190, while a second pair of similar tie rods (one shown at 179) is secured in a similar orientation between the rearward vertical member 192 (FIG. 3) of the other U-frame subassembly 60 and housing 84, utilizing similar bushings (not shown). For each tie rod, and as best seen in FIG. 6, a "piston" 194 is movable within the tie rod against a bias established by an internal spring. Such tie rods are well-known to those skilled in the art. The use of swivel mountings or universal bushings 184, 186 and 188, 190 with the tie rods, permits some degree of side-by-side, up and down and compound movements, in concert with the vertically-oriented springs 168, 170, 172 and 174. Note also that the compressible tie rods also serve as shock absorbers in that they accommodate a limited degree of "over travel" by the linear-move machine during docking.

With this arrangement, the docking station 76 "floats" relative to its supporting frame 56 for movement in at least three mutually perpendicular directions, i.e., vertical, horizontal front-to-back (and vice versa), and horizontal side-to-side. In addition, limited compound movements, i.e., tilting, swiveling and combinations thereof, are also possible by reason of the flexible nature of the vertically-oriented springs in combination with the tie-rod universal mounting arrangements. These multiple degrees of freedom of movement, in combination with the lateral adjustment enabled by the trolley 38, permit reliable and accurate docking with hydrants 28 even when the latter are out of alignment relative to the docking station.

The hydrant valve actuator assembly 86 (FIG. 10) includes a lower housing 196 provided with a pair of attachment flanges 198, 200 by which the valve actuator assembly 86 is secured between the housings 82, 84. Specifically, the valve actuator assembly 86 is attached to housing 82 via bolts extending through holes 214, 216 in attachment flange 198 and holes 112, 116 in guide wheels 104, 108 that extend into the housing 82. Dowel pins extending between holes 210 and 212 (provided in respective angled ribs or bosses 202, 204) and holes 206, 208 on attachment flange 198 may be used to align the attachment flange 198 with the housing 82. Assembly 86 is attached to the other docking station housing 84 in a similar manner.

The valve actuator assembly 86 also includes intermediate and upper housing portions 218, 220 that, combined with lower housing 196, enclose the valve actuator, as also described further below. A flexible hose 221 (see FIGS. 3-5) connects the actuator assembly 86 to the distribution pipe 27 of the truss assembly.

With reference now to FIGS. 11 and 12, an additional upper box frame 222 is mounted on the supporting frame 56 above the trolley rails 44, 46. This upper frame supports a pair of pressurized tanks or pressure accumulators 224, 226 and a junction box 228. Pressure accumulators 224, 226 are used to supply water under pressure to the valve actuator 86, and may be of any suitable design such as, for example, Teel Model No. 3P676C. External power may be supplied to the junction box 228 via cables 230, 232. A pair of batteries (for example, two 12-volt batteries, not shown but indicated as the power supply at 233 in FIG. 21) may also be supported on the drive tower of the linear-move machine 222 to provide supplemental power to the docking station PLC 336 and associated solenoids when the linear-move machine 10 is stopped and its own power generator shut off. This arrangement also utilizes the linear-move machine power generator to charge the batteries. As best seen in FIG. 12, a solenoid bank is located below the junction box 228 and is supported on a cross member of the upper frame 222. A plurality of solenoids 234, 236, 238, 240 and 242 are supported below and connected electrically to the junction box 228. The solenoids are also hydraulically connected to various controlled components. More specifically, solenoids 234 and 236 control the flow of water to and from the valve actuator 86. Solenoids 238 and 240 control the movements of the dock stops 128, 130 and solenoid 242 controls the main water control valve 357.

Figure 18:
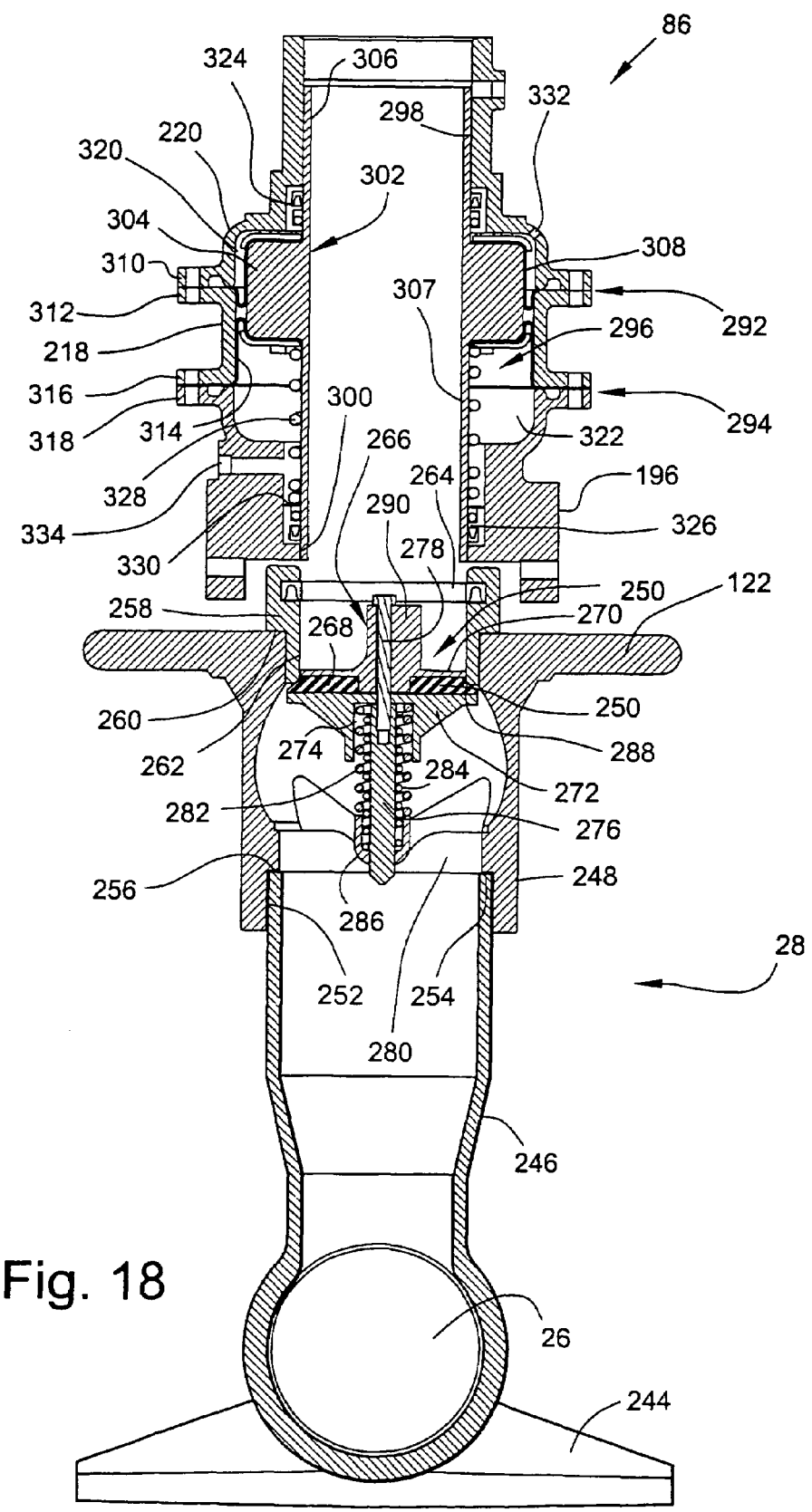
FIG. 18 is a cross section taken through the hydrant valve and hydrant valve actuator, in a valve closed position and with the hydrant fully engaged within the docking station.
Figure 19:
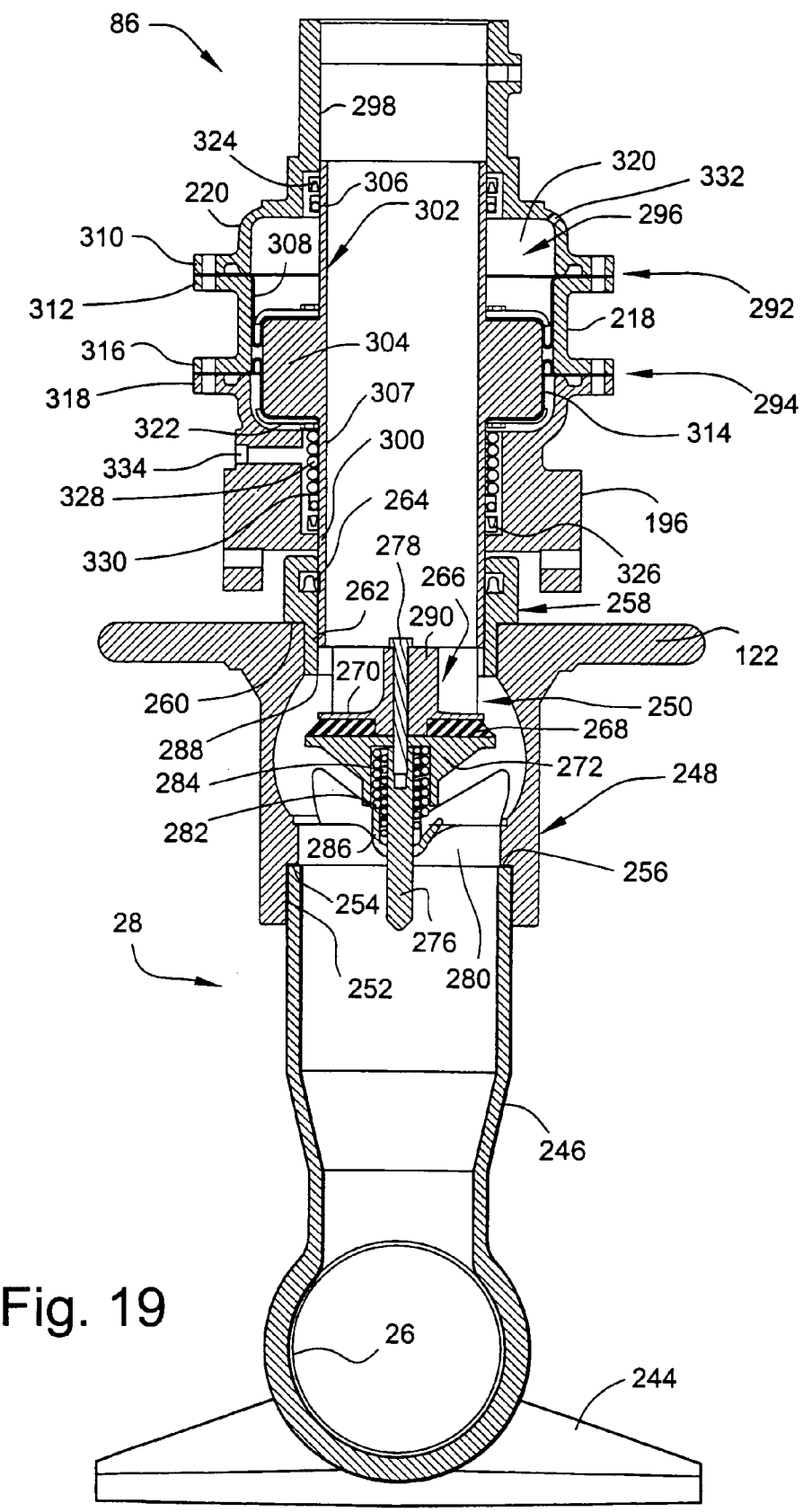
FIG. 19 is a view similar to FIG. 18 but with the hydrant valve shown in a valve open position.
Figure 20:
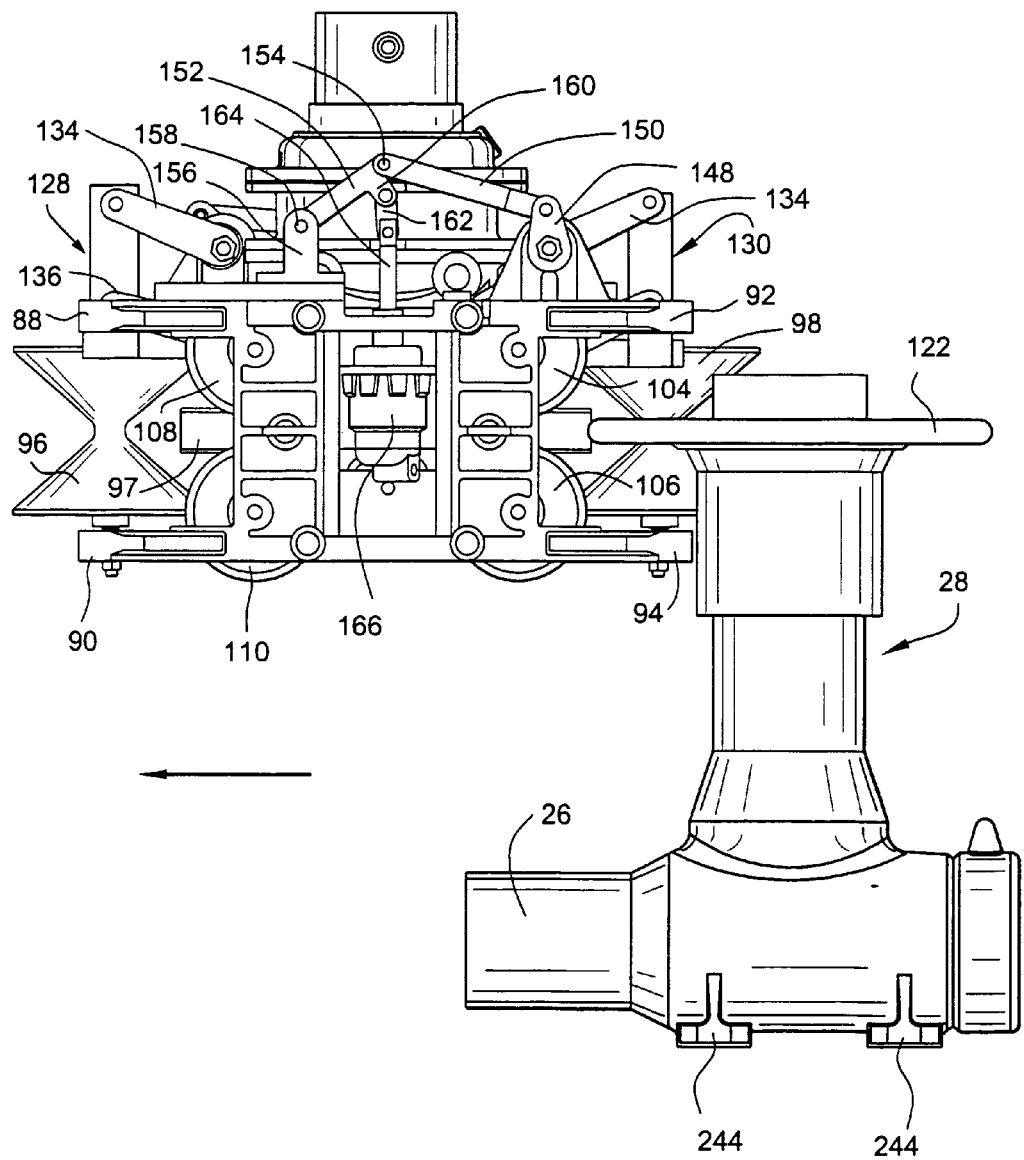
FIG. 20 is a view similar to FIG. 14 but showing the docking station disengaged and moving away from the hydrant.

Turning now to FIGS. 18 and 19, a hydrant or water supply valve 28 is shown extending upwardly from the supply pipe 26. One or more riser footings 244 may be used to stabilize the hydrant. The hydrant includes a vertical riser 246 on which a valve housing 248 including the integral docking flange 122 is secured in telescoping relationship. The valve housing 248 encloses and supports a water supply valve assembly 250 in a generally vertical orientation. The valve housing 248 is formed with a lower opening 252 with an adjacent, interior shoulder 254 by which the housing 248 is supported on the upper edge 256 of the riser 246. The manner in which the valve housing 248 is secured is within the skill of the art and may include threaded attachment, welding or other suitable means.

The upper end of the housing 248 supports a valve cup 258 formed with an external shoulder 260 that permits the cup 258 to be seated on the valve housing 248, with a smaller diameter lower portion 262 telescoped into the valve housing. A flexible annular seal 264 is seated in a groove formed in the interior of the cup. The valve assembly or simply "valve" 250 also includes an elongated stem assembly 266 with an annular Buna-Nitrile (or other suitable material) valve seal 268 sandwiched between upper and lower valve seal supports 270, 272. The lower support 272 is counterbored to create a spring recess 274 (FIG. 19). A stem 276 is attached to the upper support 270 by threaded engagement of bolt 278. The bolt 278 accesses the lower support 270 by means of a bore in the upper support 270. The stem 276 extends downwardly and through a guide spider 280 fixed near the lower end of the valve housing. A pair of coil springs 282, 284 extend between the spring recess 274 and the hub 286 of the guide spider 280, thereby biasing the valve assembly 250 upwardly to a normally closed position, with valve seal 268 engaged with annular seat 288 at the lower end of cylinder 258. The upper support 270 is also formed as a spider, with three radial webs 290 (2 partially shown) extending radially outwardly to the interior wall of the cylinder 258, thus permitting flow out of the hydrant while also providing an engagement interface for the hydrant valve actuator piston/cylinder 302 as described further below.

As already mentioned, the hydrant valve actuator 86 includes a three-part housing including the upper housing portion 220, the intermediate housing portion 218 and the lower housing portion 196, joined together at flanged interfaces 292, 294 by bolts or other suitable means. Relatively large diameter portions of the upper and lower housing portions 220, 196 in combination with the intermediate portion 218 create an enlarged interior chamber 296 axially between upper and lower smaller-diameter internal, cylindrical bores 298, 300. A unitary piston/cylinder 302 is slidable within the housing, with the piston or flanged portion 304 confined to movement within the enlarged chamber 296. An upper cylindrical part 306 of the piston/cylinder 302 slides within the upper internal bore 298 while a lower cylindrical part 307 slides within the lower internal bore 300. A first rolling diaphragm 308 is fixed between the upper end of the piston 304 and radial flanges 310, 312 at the interface 292 between the upper and intermediate housing portions 220, 218. Similarly, a second rolling diaphragm 314 is fixed between the lower end of the piston 304 and the radial flanges 316, 318 at the interface 294 between the intermediate and lower housing portions 218, 196. This arrangement creates an "extend" cavity 320 above the diaphragm 308 and a "retract" cavity 322 below the diaphragm 314 for fluid acting on opposite sides of the piston 304. Fluid seals (O-rings or the like) 324, 326 are located in respective upper and lower housing portions 220, 196 to prevent fluid leakage from chamber 296 along the internal bores 298, 300. A spring 328 is located between an interior shoulder 330 at the lower end of the lower housing section 196 (formed by a counterbore in the lower internal bore 300) and the lower side of the piston 304 to normally bias the piston-cylinder 304 in an upward direction, to the retracted position shown in FIG. 18. A first port 332 is provided in the upper portion of the housing for introduction/exhaustion of fluid into or from the extend cavity 320 and a second port 334 is provided in the lower housing section 196 for introducing/exhausting fluid into or from the retract cavity 322. The operation of the hydrant valve actuator 86 will be described further below.

Figure 21:
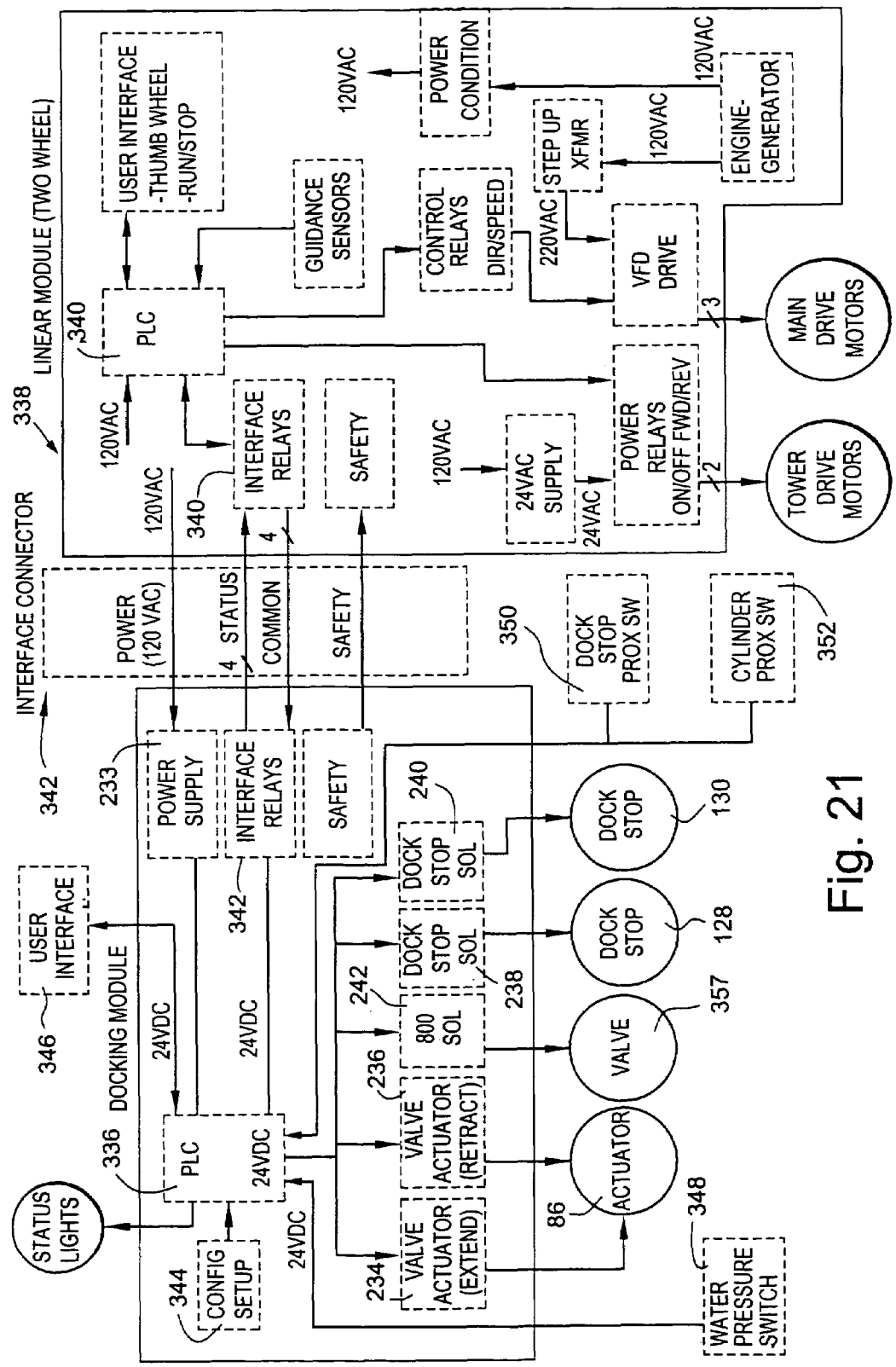
FIG. 21 is a schematic diagram of the control systems for the linear-move machine and docking station.

Before describing the operation of the docking station, a brief description of the docking station control arrangement is in order. With reference to FIG. 21, the PLC 336 is located within a panel box on the drive tower 16. The PLC 336 and associated power supply 233 (two 12-volt batteries) connect to the controller 338 including PLC 340, for the linear-move machine by means of an interface connector 342. The controller 340 may be a conventional control module for a linear-move machine with no modification required to interact with the PLC 336 for the docking station. The PLC 336 includes a pre-programmed configuration set-up 344 and receives various user commands from a user interface from an input panel 346 accessible by opening the front face of panel box 228. The PLC 336 also receives input from the water pressure switch 348, dock stop proximity switches 350 in the proximity sensors 131 and 132, and a valve actuator cylinder proximity switch 352. The PLC 336 provides output commands to the solenoids 234, 236, 238, 240 and 242.

The safety mechanisms on the docking module and linear-move machine are also coordinated through the interface connector 342. The PLC 340 of the linear-move controller 338 communicates with the PLC 336 of the docking station 76 by means of respective interface relays 340, 342. In short, the controls for the docking station 76 are integrated into the controller 338 for the linear-move machine 10, with no modification required to the controller 338. While the PLC and associated solenoids may be powered by the linear-move machine engine generator while the linear-move machine 10 is moving, it is preferred to also utilize battery power (e.g., a pair of 12-volt batteries (indicated by reference numeral 233 in FIG. 21) as supplemental power for the docking station 76 when the linear-move machine 10 is shut down during valve actuation and sprinkling.

The linear-move machine 10 and associated docking station 76 may be programmed to operate in at least five different modes: (1) simple start/stop irrigation; (2) start/stop with manual offset of the docking station 76; (3) start/stop with automatic offset of the docking station 76; (4) start/stop with one docking station 76 and substantially continuous machine movement; and (5) continuous linear-move machine movement with two docking stations 76.

(1) Simple Start/Stop

Figure 22:
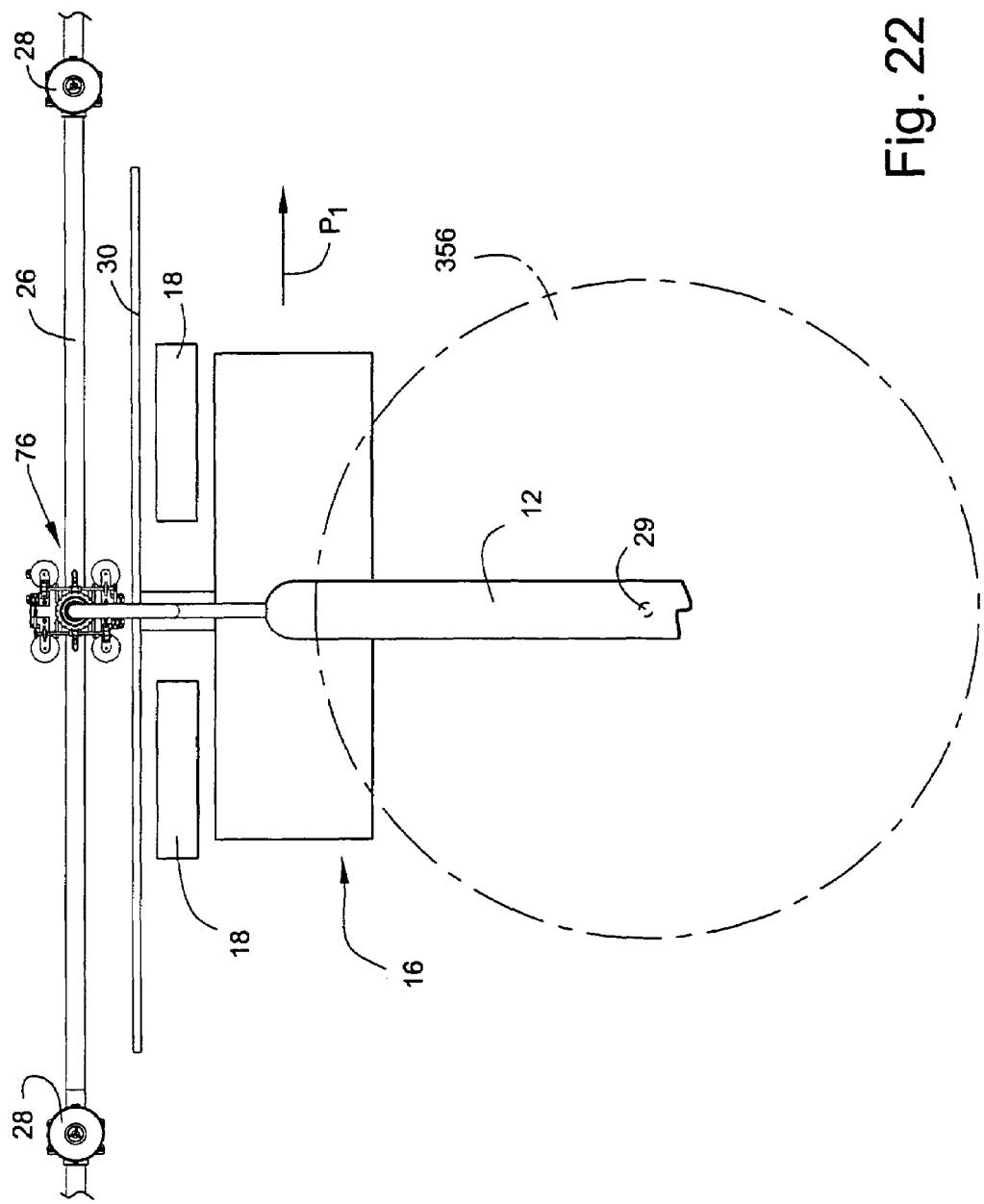
FIG. 22 is an overhead schematic illustrating a sprinkling pattern achieved when the docking station is centrally located along the side beam fixed to the end tower of the linear-move machine.

In this mode, the docking station 76 is initially located at any desired location along the side beam 30 and locked in place. Generally, for this mode of operation, the docking station 76 will remain in this position throughout the irrigation cycle. With reference to FIG. 22, when the docking station 76 is located approximately midway along the side beam 30, a circular sprinkling pattern 356 will be generated by any one of the sprinklers 29 on the truss assembly 12.

Figure 23:
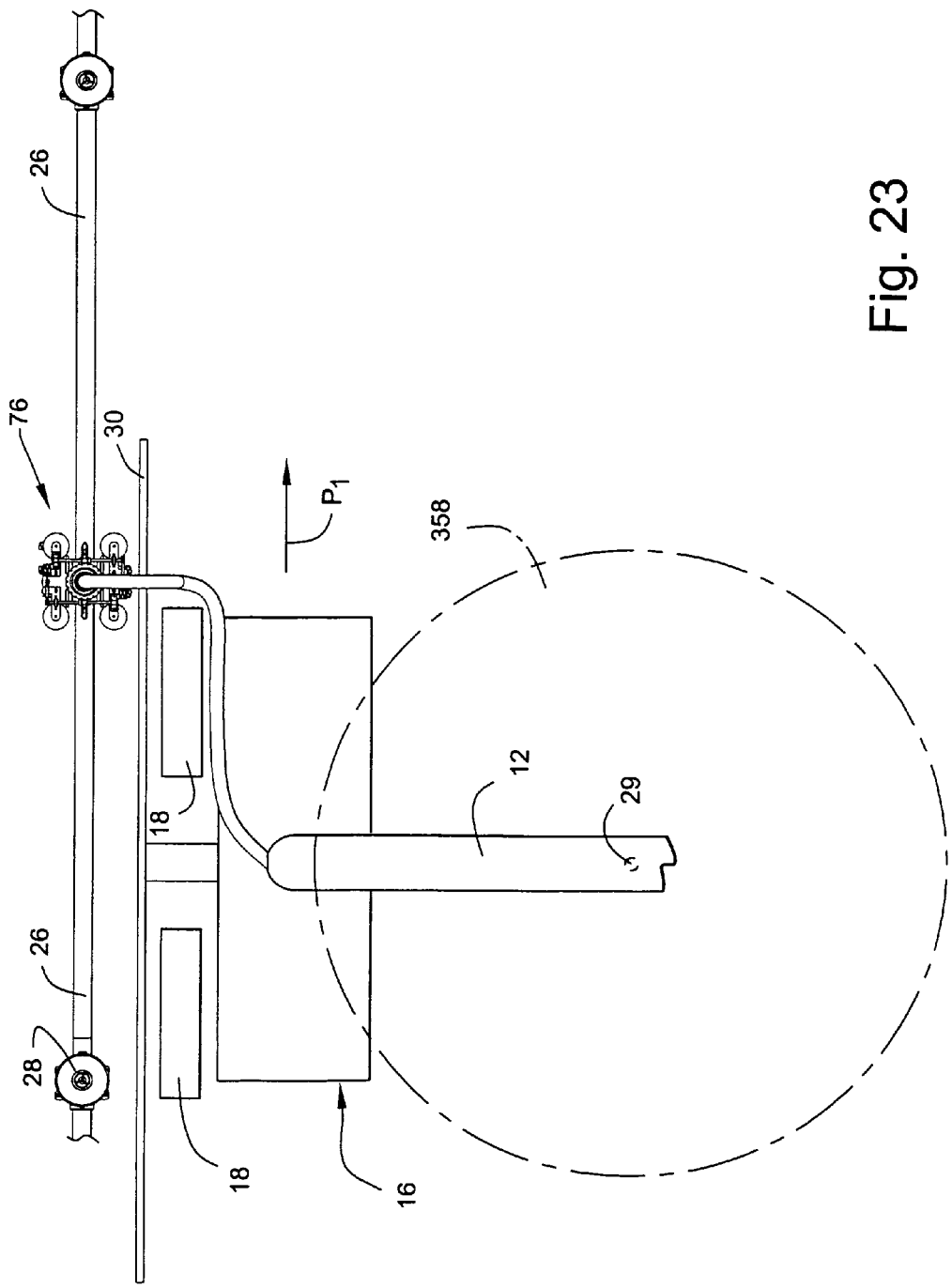
FIG. 23 is a view similar to that shown in FIG. 22, but with the docking station moved toward a forward end of the side beam attached to the linear-move machine.
Figure 24:
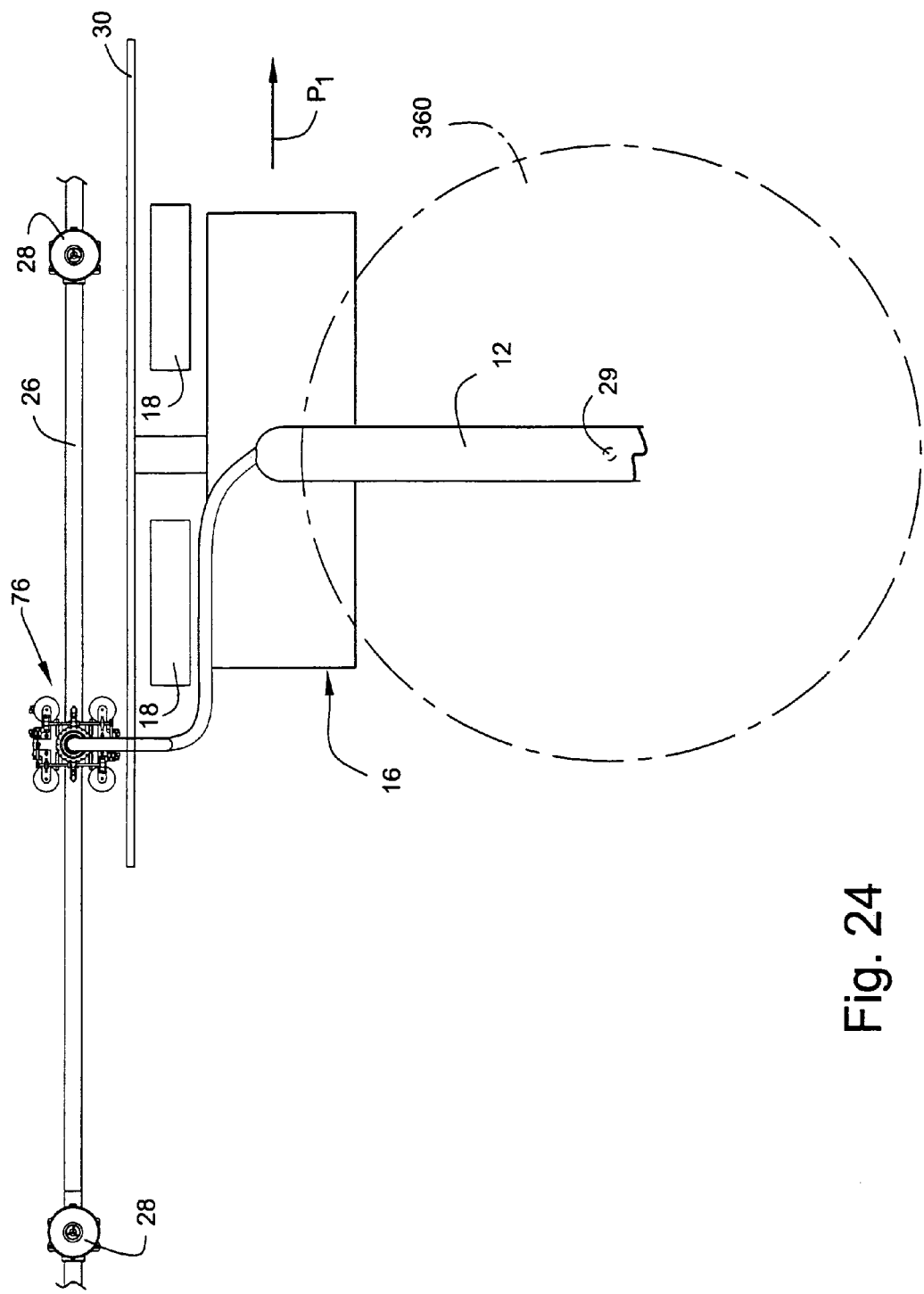
FIG. 24 is a view similar to FIGS. 22 and 23, but with the docking station located at a rearward end of the side beam attached to the linear-move machine.
Figure 25:
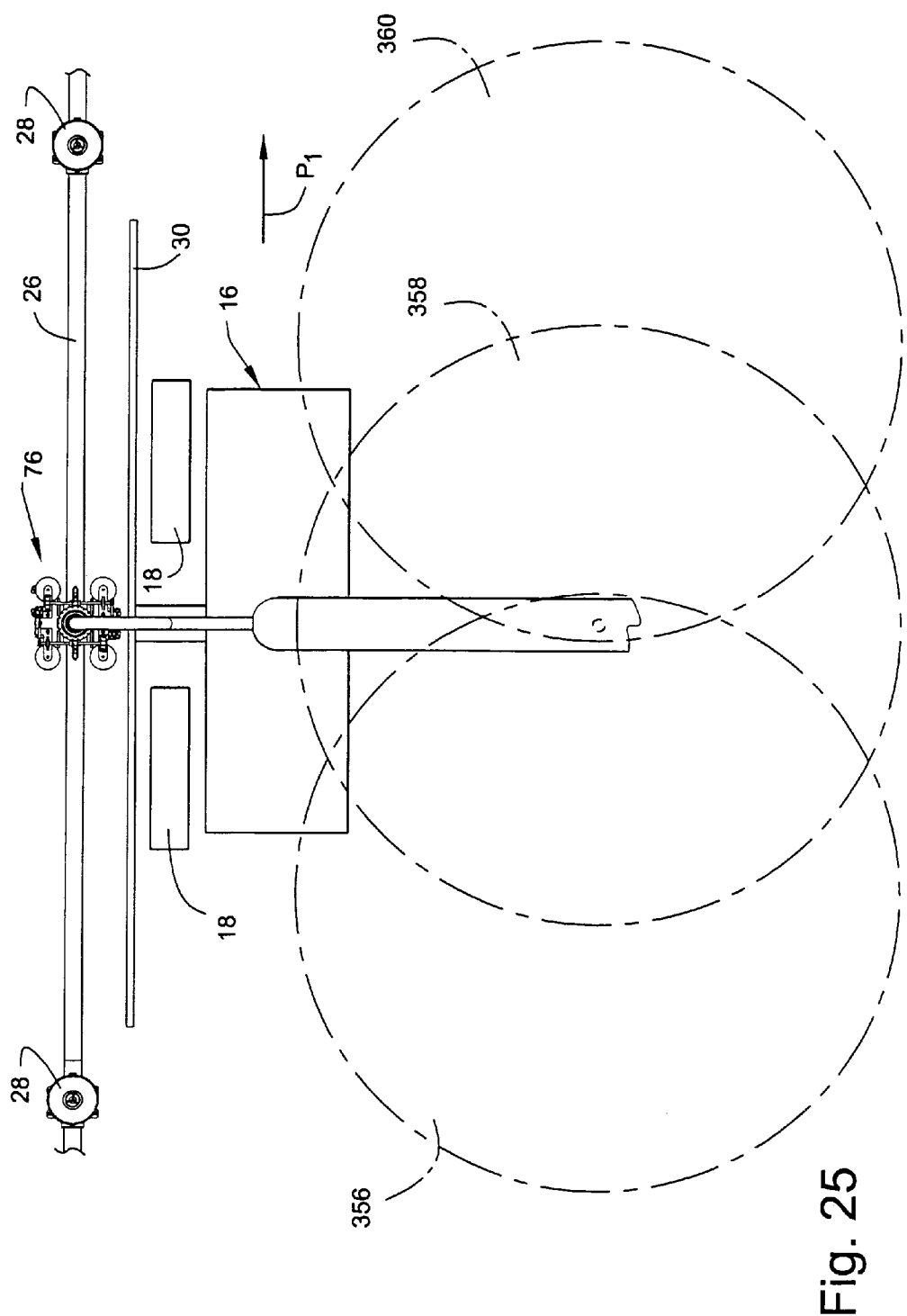
FIG. 25 is an overhead illustrating the different sprinkler patterns that are achievable with the docking station located in the positions shown in FIGS. 22, 23 and 24.

FIG. 23 illustrates a circular pattern 358 generated when the docking station 76 is located at the forward end of the side beam 30, and FIG. 24 illustrates a third circular pattern 360 generated when the docking station 76 is located at the rearward end of the side beam 30. FIG. 25 shows the positions of patterns 356, 358 and 360 relative to the truss assembly 12 and drive wheels 18 for appreciation of how the sprinkling pattern locations can be manipulated via location of the docking station 76 along the side beam 30 to achieve greater wetting uniformity in the irrigation cycle.

As the linear-move machine 10 is driven forward in the direction of path $P_1$ (FIG. 1), the dock stop 128 (forward) is in the up or go position, while the rearward dock stop 130 is in the lowered or stop position (FIG. 13).

As the linear-move machine 10 continues to move in a forward direction, the hydrant flange 122 and docking station 76 are initially roughly aligned, if necessary, by the interaction of the flange 122 with the side guide wings 72, 74 and front guide wing 124. Assuming the hydrant flange 122 and docking station 76 are not in substantial alignment during the initial contact, the vertically-oriented front guide wings 72, 74 (and/or the horizontally-oriented forward guide wing 124) will be engaged by the stationary hydrant flange 122, causing the docking station 76 to move laterally along the trolley rails 44, 46 to an aligned position, while engagement with wing 124 will cause the docking station to move upwardly as the docking station continues to move toward the hydrant. The flange 122 will then be engaged by the forward pair of V-track rollers 96, the tapered surfaces of which further center the flange 122 relative to the docking station so that the flange is located at the smallest-diameter portion of the V-track rollers, as best seen in FIG. 15. In other words, the V-shape of the spinning rollers 96 allows the free-floating docking station 76 to crawl around the hydrant flange 122 until they are aligned. The hydrant flange 122 then slides between guide wheels 104, 106 and into the side guide channel members 97 which capture the hydrant flange in the same plane as the docking station.

In an alternative arrangement, a power-assist feature may be added to facilitate lateral movement of the docking station on the trolley 38 upon engagement of the hydrant flange 122 with one or the other of guide wings 72, 74. This would function similar to power brakes or power steering in a vehicle, and could employ oil hydraulics, water hydraulics, pneumatics, or electric motors to move the docking station along the trolley rails 44, 46.

As the hydrant flange 122 is captured by the docking station 76, the linear-move machine 10 continues forward travel until the hydrant flange 122 touches the rearward docking stop 130. More specifically, when the docking stop proximity switch 132 (part of the stop) is tripped (for example, when the flange 122 is within a few millimeters of the stop), it signals the PLC in the control panel to stop the forward movement of the linear-move machine. At this point, the linear-move machine "coasts" into engagement with the docking stop 130. The hydrant flange 122 is now fully captured by the docking station 76, and the linear-move machine is in position to connect to the water supply valve. Depending on the normal operating speed of the linear-move machine, a second proximity switch may be used "upstream" of the switch 132 for the purpose of effecting a reduction in speed of the linear-move machine as it approaches the hydrant.

When the docking station is fully aligned with the hydrant water supply valve, only the flange 122 is engaged with the docking station. In other words, the docking station selfaligns with the flange 122, the alignment determined by the dock stop 130, the laterally opposed and axially spaced pairs of guide wheels 104, 106 and 108, 110, and the opposed, horizontally-oriented channel members 97 and associated side-guide wheels 99 on the interior sides of the housings 82 and 84. Note that in the fully aligned position, the flange is located between and axially spaced from the forward and rearward V-track rollers.

The PLC 336 now sends a command to port water from the pressure accumulators 224 and 226 (they are connected in parallel) through the extend on/off control solenoid valve 234 to the extend diaphragm cavity 320 in the actuator assembly 86. At the same time, the same solenoid vents water in the retract cavity 322. The water force in the extend cavity 320 overcomes the force of spring 328 and pushes the lower cylinder portion 307 down into the hydrant valve housing 248. The cylinder 307 eventually travels through the valve cup 258, and as the cylinder continues its downward movement, the valve seal 268 is pushed off the valve seat 288 to thereby open the valve. After extend on/off control solenoid 234 has been signaled by the PLC, a time delay allows sufficient time for system water pressure to recharge both pressure accumulator tanks 224, 226 (as needed). After the time delay, the PLC 336 sends a command to solenoid 242 to open the control valve 357 located where the hose 221 joins the water distribution pipe 27 so that water is then free to flow via the valve through the piston-cylinder 302 through the distribution pipe supported on the truss assembly 12 and to the sprinklers 29.

After the sprinklers have run for the programmed amount of time, the PLC 336 sends a command to solenoid 242 to close the control valve 357 to prevent water from draining out of the linear-move machine 10, via pipe 27. The PLC 336 then sends a command to vent water from the "extend" cavity 320 through the main water extend on/off control solenoid valve 234 to atmosphere. This removes the downward force on the rolling diaphragm 308. At the same time, the PLC 336 sends a command to port water to the "retract" cavity 322 through the main water retract on/off control solenoid valve 236. The spring 328 and diaphragm 314 now push the piston-cylinder 302 back up into the actuator housing to the position shown in FIG. 18. As the piston-cylinder 302 retracts, the valve seal assembly 250 is pushed upward by the valve springs 282, 284 until the valve seal 268 seats on the valve seat 288 and shuts off water flow. When a proximity switch 352 senses the actuator cylinder 307 is retracted, the PLC 336 initiates forward movement of the linear-move machine 10 to the next hydrant. To initiate such forward movement, water is first ported through the solenoid 240 that operates hydraulic actuator 166. The hydraulic actuator 166 extends its output shaft 164 to thereby raise the stop 130 out of the path of the flange 122 to the retracted or "go" position. The linear-move machine 10 then begins to drive forward to the next hydrant. When the docking station is disengaged from the hydrant flange, the springs 71, 73 and 75, 77 will return the docking station to its centered position along trolley rails 44, 46. Following a programmed time delay to ensure that the docking station 76 has cleared the hydrant, the PLC sends a command to solenoid 240 to port water from the hydraulic actuator 166 to atmosphere. The hydraulic actuator rod 164 is forced to retract by an internal spring, rotating the dock stop 130 to its extended or "stop" position. The dock stop 130 is now in position to stop the docking station at the next hydrant. It will be appreciated that dock stop 128 will operate in the same manner when the linear-move machine travels in the opposite direction. Thus, stop 128 is always retracted when the linear-move machine travels along path $P_1$, and stop 130 is always in the retracted position when the machine travels along path $P_2$.

In this example, water from the irrigation pipes is used as a hydraulic drive fluid. A closed hydraulic system employing standard hydraulic fluids, a pump, reservoir, and filter could also be employed. A water glycol fluid is currently under consideration. A pneumatic system could also be used employing a compressor, filter and reservoir. An electric jack screw or actuator could also connect to the valve actuator 86 and be used to drive it up and down into the hydrant valve 28.

The hydraulic control lines that feed the "extend" and "retract" cavities on the valve actuator assembly 86 can have in-line orifices to provide flow rate control in and out of their respective cavities. This will control how fast the valve will turn on and off. By controlling valve opening and closing speed, water hammer will be kept to a minimum.

Figure 26:
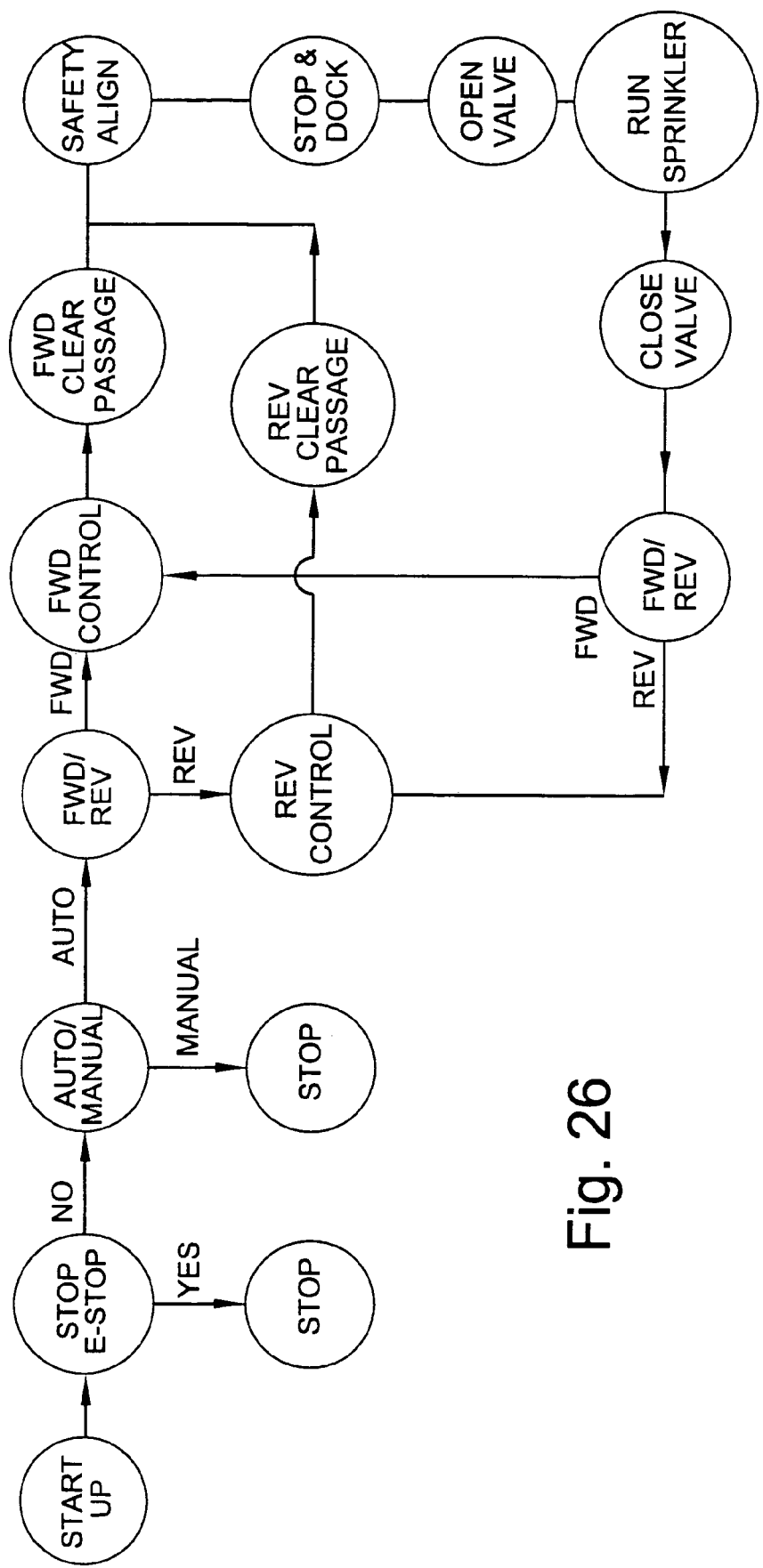
FIG. 26 is a flow chart illustrating the control sequence for the linear-move machine and docking station in a start/stop mode of operation.

A simple flow chart illustrating operation in this mode is shown in FIG. 26. Initially, the system checks to see that all safety criteria have been met. If not, the machine will stop. Similarly, when the linear-move machine is wired to the docking station module, operation is in an "auto" mode. If "manual" is chosen or indicated, the machine will stop. The remaining events are in a simple logic loop form, depending on the direction of movement of the machine.

(2) Start/Stop with Manual Offset

This mode is essentially identical to the mode described above, but with the option of manually offsetting the docking station 76 for the next set of moves, for example, from the position shown in FIG. 22 to the position shown in FIG. 23. This would improve the overall systems water distribution efficiency over the course of many applications of water. Offsetting the docking station 76 is accomplished easily by manually moving the trolley 38 along the rail or side beam 30 and pinning it in its new desired position. Otherwise, the operation is as described above for the first mode.

(3) Start/Stop with Automatic Offset

This mode is essentially identical to mode (2) but with an automatic offsetting feature, controlled by the PLC 336. This would allow the linear-move machine 10 to move down the field along path $P_1$ in a first run with the docking station 76 fixed in the position shown, for example, in FIG. 21. The PLC would send a command to automatically apply an offset (as shown in, for example, FIG. 23) at the end of the field, and then return back in a second run along path $P_2$, applying water in a pattern 358 offset from the first pattern 356. The automatic movement of the docking station 76 along side beam 30 can be achieved by any suitable mechanical, electromechanical, hydraulic, pneumatic or other drive means in concert with appropriate programming of the PLC 336 as would be well understood by those skilled in the art.

(4) Start/Stop Semi-Continuous Mode

Figure 29:
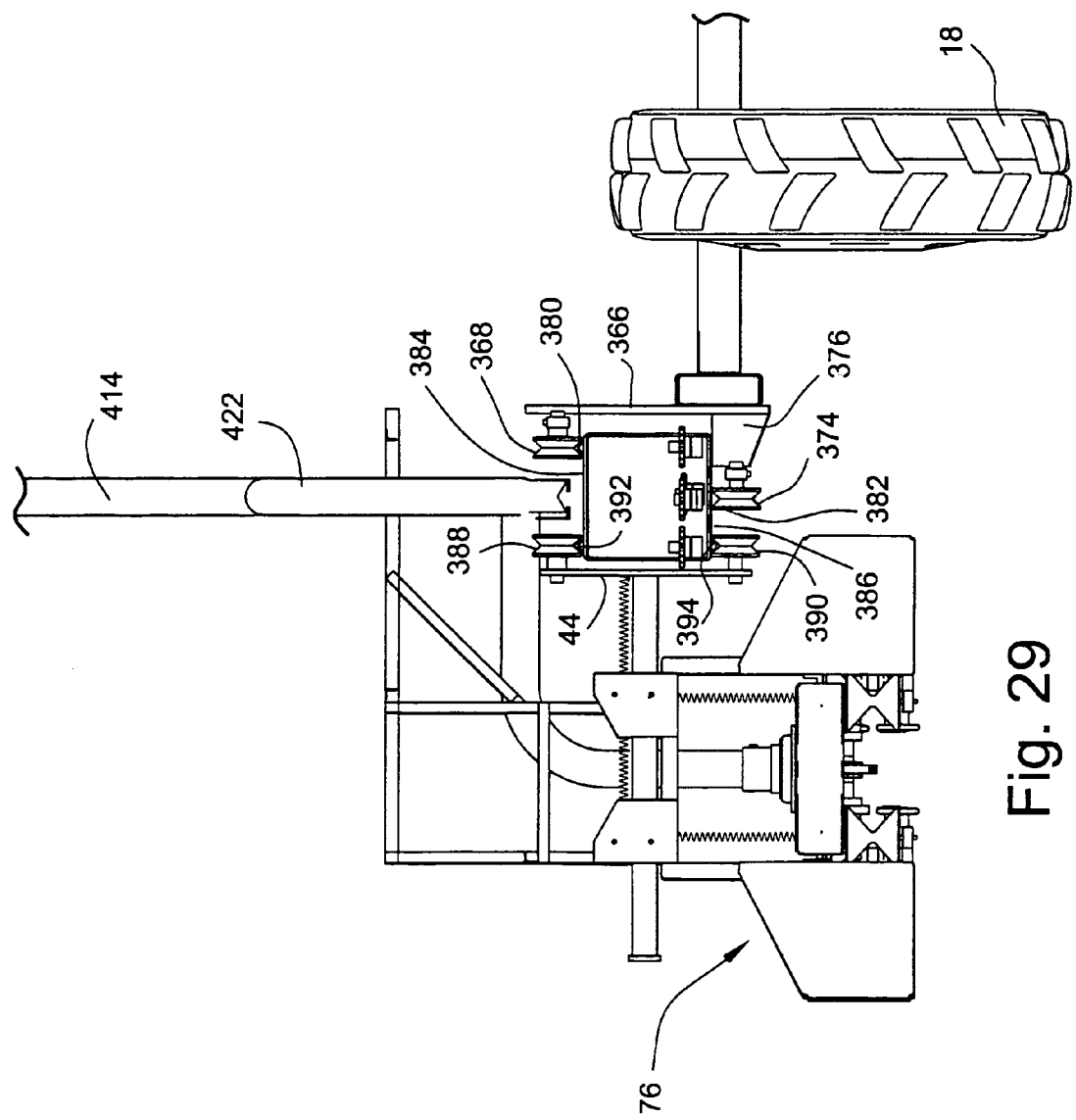
FIG. 29 is a front elevation of the linear-move machine shown in FIG. 27.
Figure 30:
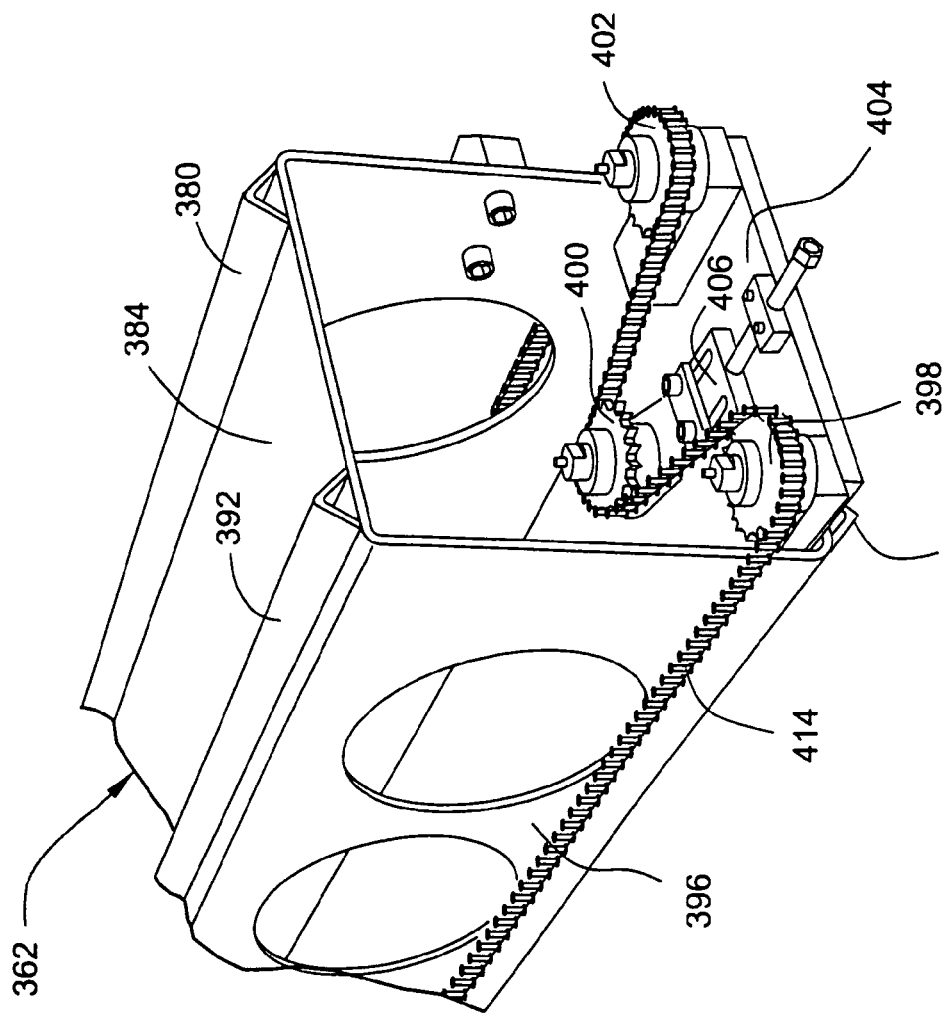
FIG. 30 is an enlarged detail taken from FIG. 28.
Figure 31:
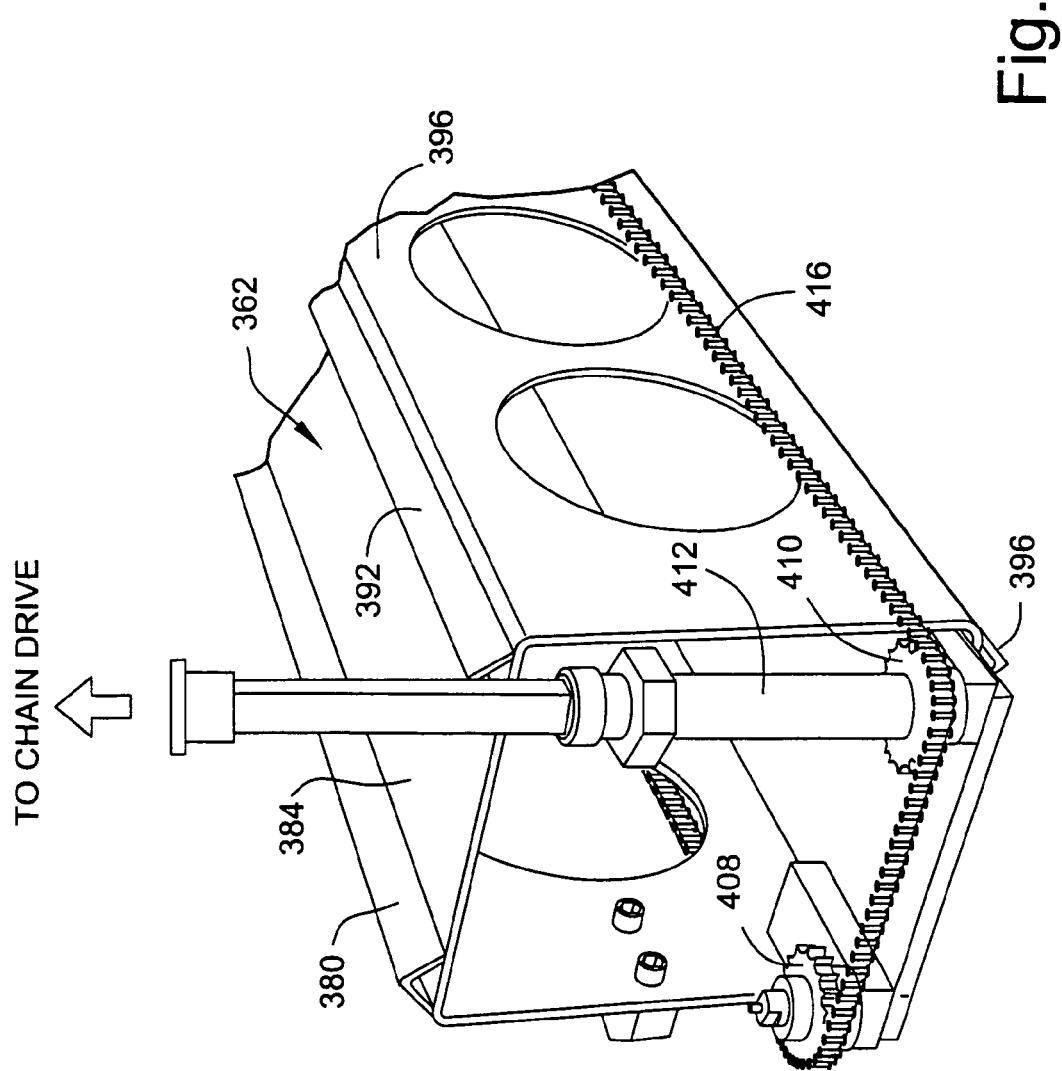
FIG. 31 is an enlarged detail taken from the opposite end of the machine shown in FIG. 29.
Figure 32:
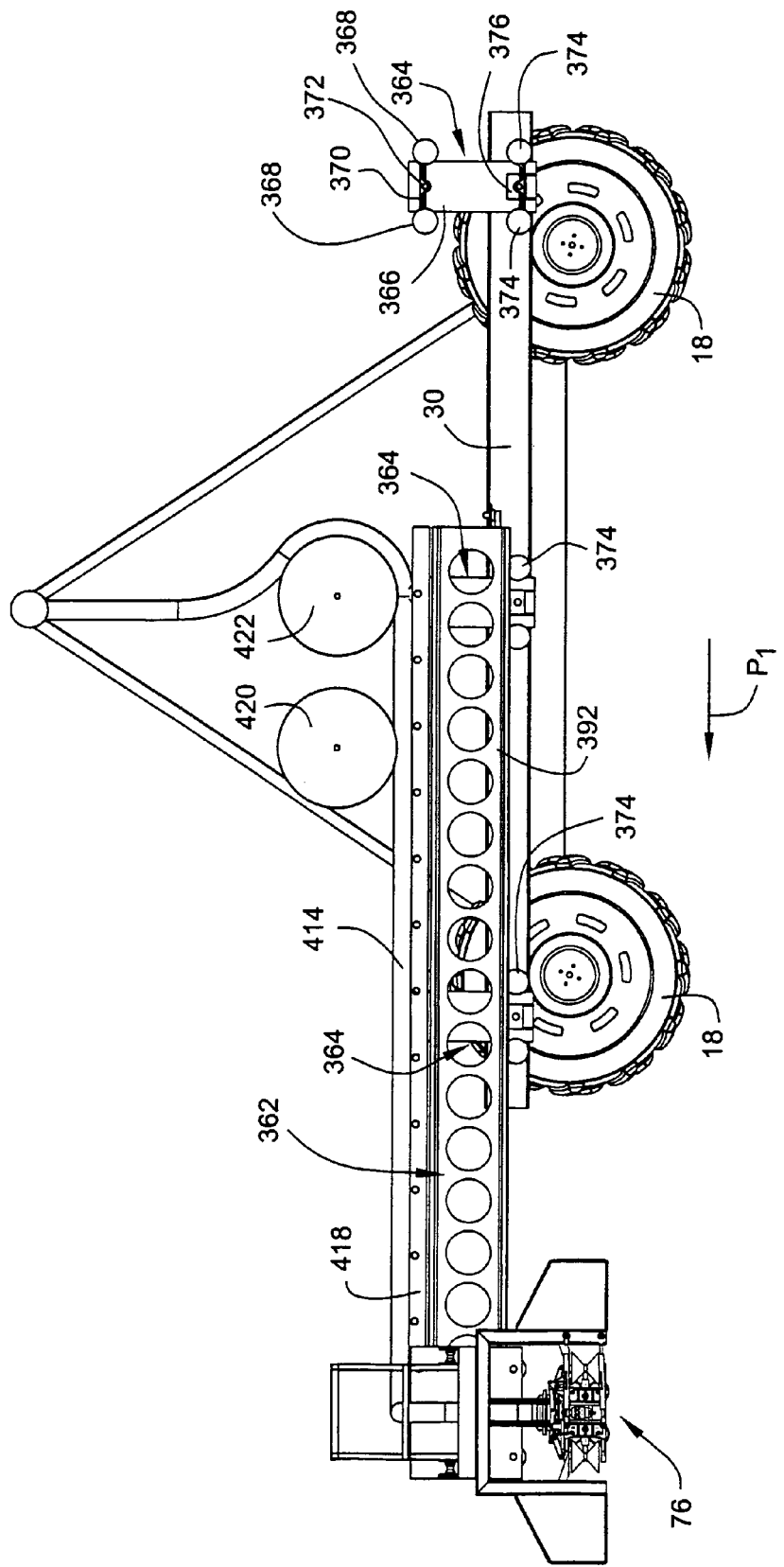
FIG. 32 is a partial side elevation similar to FIG. 27, but with the telescoping arm and docking station moved to an extended rearward position.

With reference to FIGS. 27-32, for this start/stop continuous mode, the support structure for the docking station is modified to include a second beam 362 (also referred to as the "telescoping arm") movable along the side beam 30. The rigid, stationary side beam 30 remains fixed to the drive tower 16 as described above. In this embodiment, however, the side beam mounts plural roller brackets 364 (three in the exemplary embodiment). Each roller bracket includes a vertically-oriented plate 366 fixed to the side beam 30 at axially spaced intervals, for example, one adjacent each of the forward and rearward ends of the side beam 30, and one intermediate the ends. As best seen in FIG. 32, each plate 366 supports a first upper pair of rollers 368 mounted for rotation at opposite ends of a roller support rod 370 fixed to the plate 366 by an axially centered pin or bolt 372. A lower pair of rollers 374 is identically mounted but spaced laterally outwardly of the side beam by a spacer block 376 (FIG. 29).

The telescoping arm 362 is shown substantially square in cross section in the exemplary embodiment, but is not necessarily limited to that shape. The arm is provided with elongated rails 380, 382 (FIG. 29) running along the length of the telescoping arm. One rail 380 is located on the upper surface 384 of the telescoping arm 362, adjacent the inner side (closest to the drive tower) thereof. The second rail 382 is located on the lower surface 386 of the telescoping arm, substantially centered thereon as apparent from FIG. 29. The telescoping arm 362 is oriented such that upper rollers 368 on the roller brackets 364 engage the upper rail 380 while the lower rollers 374 engage the lower rail 382. This arrangement permits the telescoping arm 362 to slide forwardly and rearwardly along the fixed side beam 30 between rearward-extended and forward-extended positions. At the same time, the docking station 76 and its supporting trolley 38 are movable to desired locations along the telescoping arm 362 via upper and lower pairs of rollers 388, 390 engaged on additional upper and lower rails 392, 394 fixed to the upper and lower surfaces of the telescoping arm, adjacent the outer side wall 396. The mounting of the docking station 76 to the telescoping arm 362 is substantially identical to the manner in which the docking station is supported on the side beam 30 in the earlier-described embodiments.

In the exemplary embodiment, the telescoping arm 362 is moved along the fixed side beam 30 by means of a chain drive. Specifically, a group of three sprockets 390, 400, 402, best seen in FIG. 30, is located at one end of the arm, supported on the lower inner surface 404 for rotation about vertical axes. The middle sprocket 400 serves as a tensioner in that it can be adjusted axially along a slot in the bracket 406 to adjust the chain tension in conventional fashion.

The opposite end of the lower surface of the telescoping arm is fitted with a pair of sprockets 408, 410, shown in FIG. 31. Sprocket 408 is an idler sprocket while sprocket 410 is a drive sprocket, attached to a vertically oriented drive shaft 412. A first drive chain 414 extends between one side of the docking station trolley plate 40, around the three sprockets 398, 400, 402 and along the telescoping arm 362 to an attachment point on one side of roller support bracket 364 in the middle of the fixed side beam 30. A second drive chain 416 extends between the opposite side of the docking station trolley plate 40, around the two sprockets 410, 408 and along the telescoping arm 362 to an attachment point on the other side of the middle roller support bracket 364. Accordingly, rotation of the drive shaft 412 in a clockwise direction will cause the telescoping arm 362 to move to the left (relative to the fixed beam) as viewed in FIG. 27 while rotation in a clockwise direction will cause the telescoping arm 362 to move to the right. Shaft 412 is connected to a suitable motor and clutch arrangement under the control of the docking station PLC.

Figure 27:
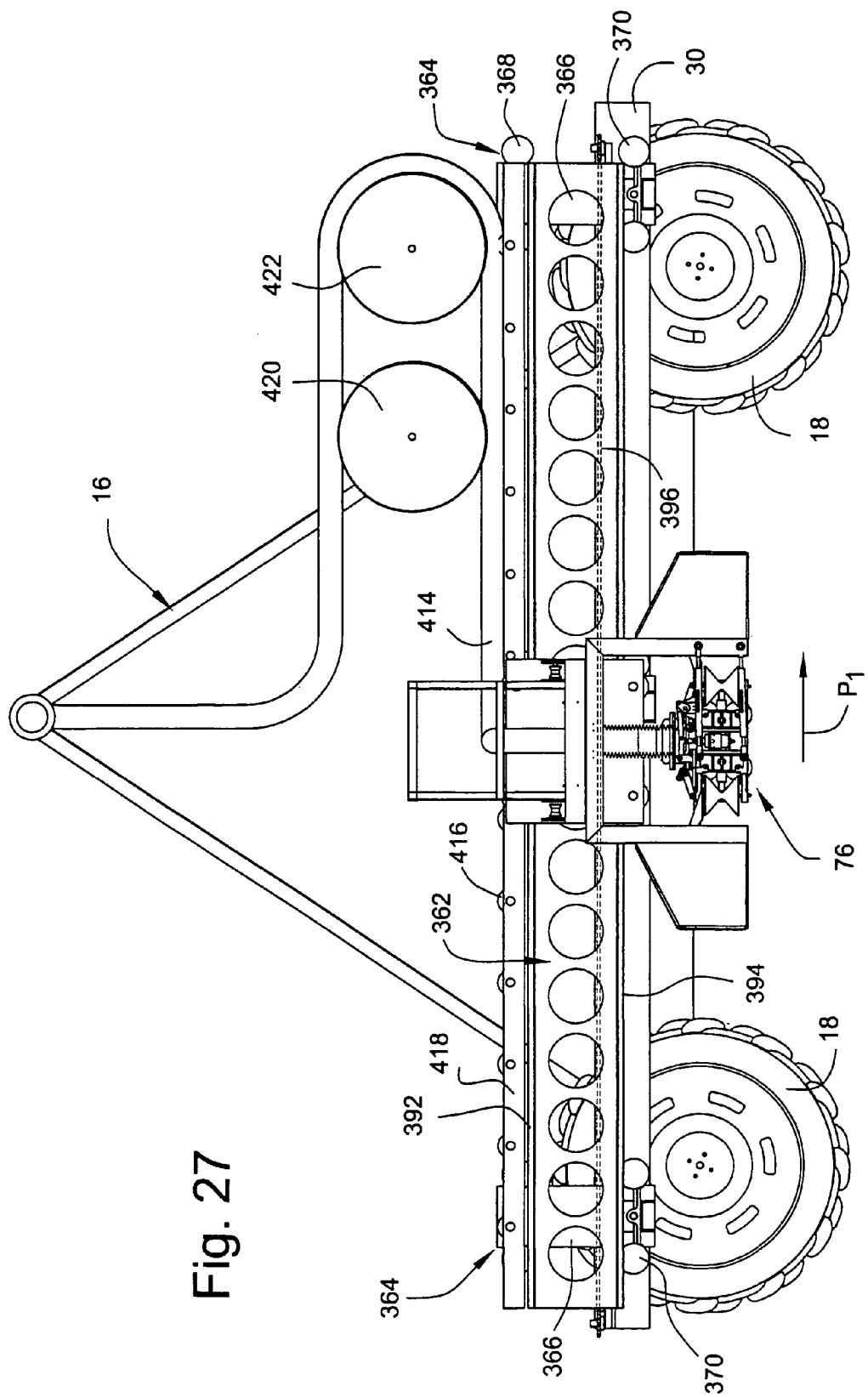
FIG. 27 is a partial elevation of a linear-move machine incorporating a docking station in accordance with another exemplary embodiment of the invention.
Figure 28:
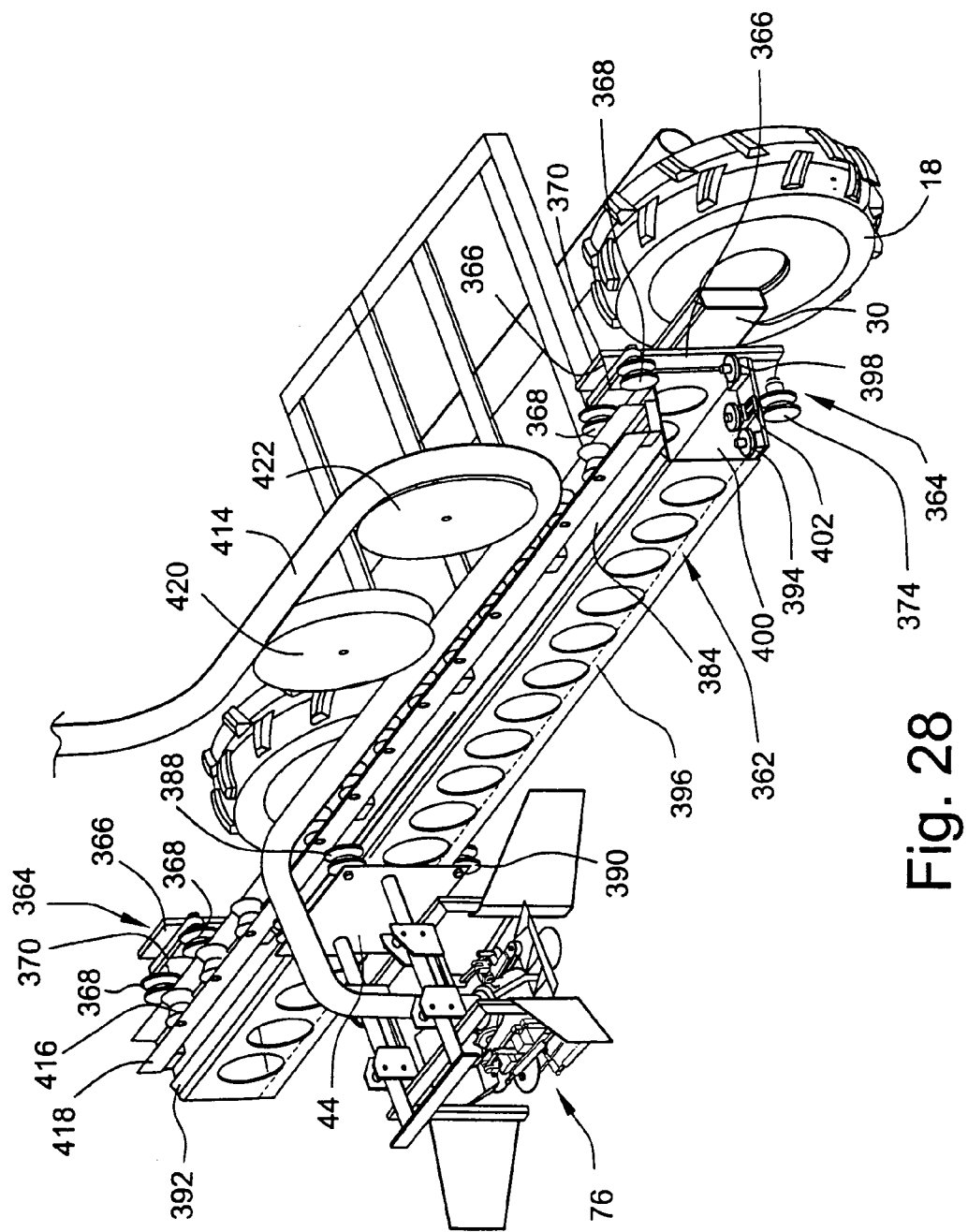
FIG. 28 is a partial perspective view of the linear-move machine shown in FIG. 27.

More specifically, a neutral position exists when the docking station 76 mounted on the telescoping arm 362 is centered along the length thereof, and when the telescoping arm 362 is itself aligned with and adjacent the fixed beam 30 as shown in FIG. 27. Rotating the drive shaft 412 in a counterclockwise direction pulls the telescoping arm 362 forwardly relative to the fixed side beam 30, while at the same time, moving the docking station 76 to the front of the telescoping arm 362. This is the position assumed when the first hydrant 28 is engaged at commencement of travel of the linear-move machine 10 along the path $P_1$. In other words, the first hydrant 28 engaged by the docking station 76 is forward of the drive tower 16, i.e., with the telescoping arm 362 extended forwardly to its maximum extent, and the docking station 76 at its forwardmost position on the telescoping arm. With the first hydrant fully engaged and with the hydrant valve open, the linear-move machine 10 begins moving forward. As it does so, the telescoping arm 362 retracts relative to the fixed beam 30 and the linear-move machine. As the linear-move machine continues its forward progress, the telescoping arm 362 continues to retract relative to the fixed side beam 30 and eventually extends rearwardly of the machine. When the telescoping arm 362 approaches its rearwardmost extended position, and with the docking station 76 now at the rearward end of the telescoping arm, as shown in FIG. 32, the linear-move machine is halted. The docking station is de-coupled from the first hydrant 26 and the telescoping arm 362 is then again moved forwardly so as to extend beyond the fixed beam 30 and into position for coupling with the next (or second) hydrant. During this movement, the chain drive also moves the docking station 76 from the rearward end to the forward end of the telescoping arm. The docking station 76 is then coupled to the second hydrant and the linear-move machine resumes movement along the path $P_1$. This action is repeated as the linear-move machine moves from one end of the field to the other.

Depending on economics, the telescoping arm 362 could be eliminated and the hydrants 28 along the water supply pipe 26 could be located closer to each other, i.e., with a spacing roughly equal to the travel distance of the docking station 76 along the fixed side beam 30.

In order to accommodate movement of the telescoping arm 362 along the fixed side beam 30, and movement of the docking station 76 along the telescoping arm 362, hose management hardware is required. In this embodiment, the flexible supply hose 414 connecting the valve actuator on the docking station 76 to the overhead truss assembly 12, is permitted to seat on a plurality of V-rollers 416 mounted for rotation within an elongated channel member 418 fixed on the upper surface of the telescoping arm 362. These rollers cooperate with a pair of considerably larger drum wheels 420, 422 that are supported on the telescoping arm 362 directly above the rollers 416. With the hose extending between rollers 416 and drum wheels 420, 422 as shown in FIG. 27, and then winding back across the tops of the drum wheels 420, 422, it will be appreciated that the hose 414 will move in a controlled manner, as the telescoping arm 362 moves between its extended rearward and extended forward positions, and as the docking station 76 moves simultaneously between rearward and forward positions on the telescoping arm.

(5) Continuous Mode

Figure 33:
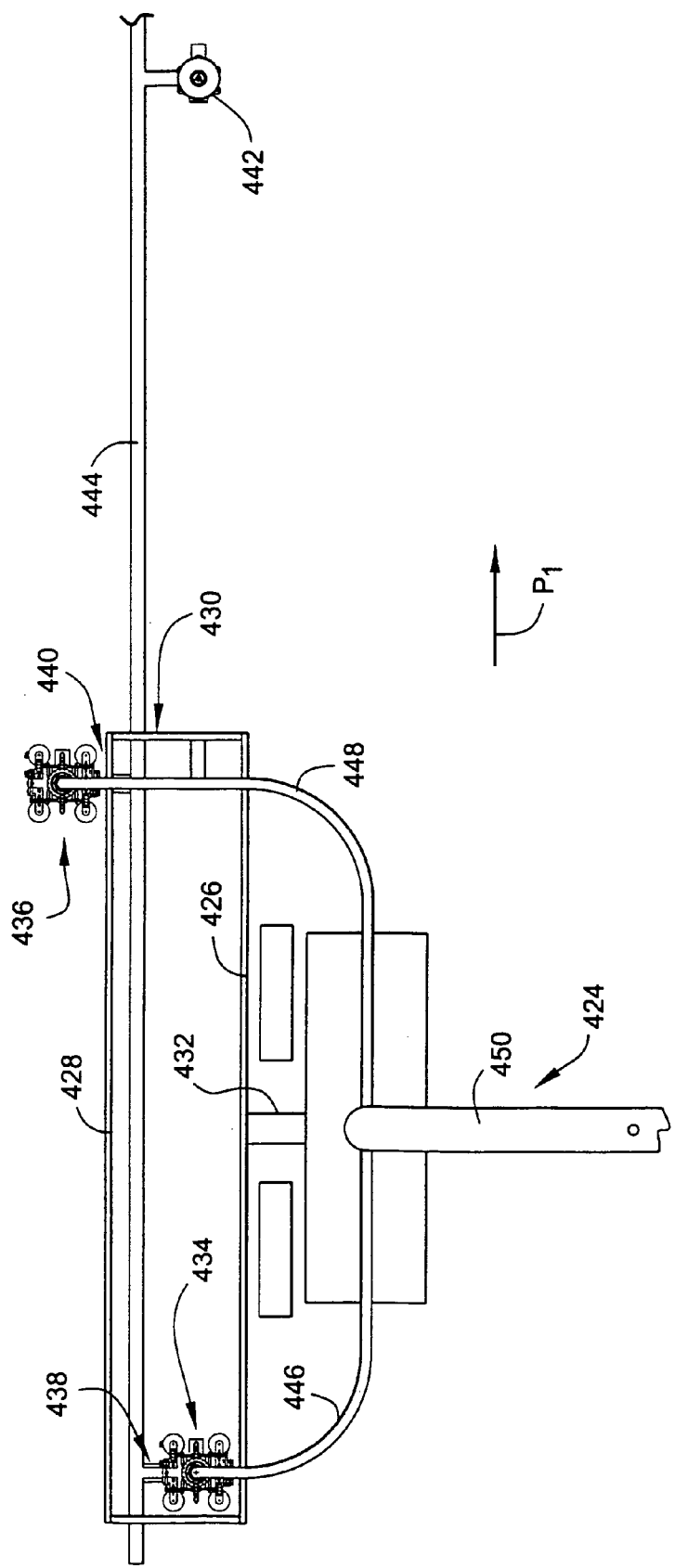
FIG. 33 is a schematic drawing of a continuous docking configuration in accordance with another embodiment of the invention.

In this mode, two telescoping docking stations are employed. With reference to FIG. 33, the linear-move machine 424 is fitted with inner and outer fixed beams 426, 428, respectively, that form a box-like frame 430 attached to the drive tower 16 by one or more connecting beams 432, as appropriate. A first docking station 434 is mounted for movement along the inner fixed beam 426, while a second docking station 436 is mounted for movement along the outer fixed beam 428. The docking stations 434 and 436 are similar to docking station 76, and the mounting of these docking stations and associated trolleys to the fixed beams 426, 428 is also similar to the mounting of the docking station 76 to the beam 30 via trolley 38. Here, however, the docking stations are driven along the respective beams by chain, cable, belt drive or other suitable means along with a motor and clutch arrangement. In addition, the hydrants 438, 440, 442, etc. are offset from supply pipe 444, in opposite directions, in alternating fashion. This arrangement allows the docking stations 434 and 436 to engage alternate hydrants on opposite sides of the supply pipe. To facilitate this movement, flexible hoses 446, 448 connect the docking stations 434, 436 to the water distribution pipe 450 on the overhead truss assembly.

In operation, docking station 434 will engage hydrant 438 while docking station 436 is moved along fixed beam 428 to engage the next hydrant 440 on the opposite side of pipe 444. After docking station 436 engages hydrant 440, docking station 434 will disengage hydrant 438 and move forward along inner beam 426 to the next hydrant 442 as the linear-move machine also moves forward. During movement of the machine, it will be apparent that docking station 436 remains stationary relative to hydrant 440 while outer frame 430 moves forward with the machine. This arrangement permits continuous movement of the linear-move machine from one end of the field to the other, without having to stop for engagement with the hydrants along the water supply pipe.

The above-described docking station configurations provide a reliable and relatively simple solution to the problems normally associated with linear-move machines that incorporate an automatic docking feature.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A linear water feed apparatus for use in agricultural irrigation comprising:
   a linear-move machine including a mobile truss assembly supporting a plurality of individual sprinklers and adapted for movement in a specified direction across a field to be irrigated, the truss assembly oriented transverse to the specified direction;
   a supply pipe arranged in said specified direction along or within the field to be irrigated, said supply pipe mounting a plurality of water supply hydrants at spaced locations along said pipe, each of said hydrants enclosing a water supply valve; and
   a fixed side beam mounted on one end of said truss assembly closest to said supply pipe extending substantially parallel to said supply pipe; a telescoping arm mounted on said fixed side beam for movement in two opposite and parallel directions relative to said fixed side beam; a docking station including a support frame mounted on said telescoping arm for movement along said telescoping arm in said two opposite directions; said docking station resiliently suspended from said supporting frame for linear, transverse and compound movements.

2. The linear water feed apparatus of claim 1 wherein said fixed beam mounts a first plurality of rollers and said telescoping arm mounts a first plurality of rails engageable with said first plurality of rollers to enable movement of said telescoping arm relative to said fixed beam in said two opposite and parallel directions.

3. The linear water feed apparatus of claim 2 wherein said support frame mounts a second plurality of rollers and said telescoping arm mounts a second plurality of rails engageable with said second plurality of rollers to enable movement of said docking station in opposite directions along said telescoping arm.

4. The linear water feed apparatus of claim 3 and further comprising a flexible supply hose connected between said docking station and said truss assembly, said flexible supply hose at least partially supported on a third plurality of rollers supported on said telescoping arm.

5. The linear water feed apparatus of claim 2 wherein said telescoping arm is moveable along said fixed beam by means of a chain drive.

6. The linear water feed apparatus of claim 5 wherein said docking station is moveable along said telescoping arm by means of said chain drive, arranged such that movement of said telescoping arm in one direction relative to said fixed beam causes movement of said docking station relative to said telescoping arm in said one direction.

7. The linear water feed apparatus of claim 1 wherein said support frame is secured to a trolley movable in a direction substantially transverse to said two opposite and parallel directions.

8. The linear water feed apparatus of claim 7 wherein said docking station is suspended from an upper portion of said support frame by a plurality of springs.

9. The linear water feed apparatus of claim 8 wherein a plurality of spring-loaded, compressible tie rods extend substantially horizontally between said docking station and a lower portion of said support frame.

10. The linear water feed apparatus of claim 7 wherein said trolley comprises a pair of rails extending between fixed plates at opposite ends of said compressible tie rods, said support frame including rollers engaged with said rails to permit said support frame to roll along said rails between said fixed plates.

11. The linear water feed apparatus of claim 1 wherein said support frame mounts a first pair of substantially vertical guide wings on respective opposite sides of said docking station, extending forward of and angling laterally away from said docking station.

12. The linear water feed apparatus of claim 11 wherein said support frame mounts a second pair of substantially vertical guide wings on respective opposite sides of said docking station, extending rearward of an angling laterally away from said docking station.

13. The linear water feed apparatus of claim 12 and further including a first substantially horizontal guide wing extending forwardly of and angling upwardly away from said docking station.

14. The linear water feed apparatus of claim 13 and further including a second substantially horizontal guide wing extending rearwardly of and angling upwardly away from said docking station.

15. The linear water feed apparatus of claim 1 wherein said docking station supports a water supply valve actuator located between a pair of housings, said housings each supporting at least one pair of vertically aligned cooperating guide wheels for rotation about parallel horizontal axes, a pair of axially spaced forward and rearward rollers for rotation about parallel vertical axes, an inwardly-facing open channel member, and a side guide roller projecting through an aperture in said open channel member.

16. The linear water feed apparatus of claim 15 wherein each housing supports a second pair of vertically aligned cooperating guide wheels for rotation about parallel horizontal axes.

17. The linear water feed apparatus of claim 16 wherein said first and second pair of cooperating guide wheels, said pair of axially spaced rollers, said open channel member and said side guide roller of each housing together define a docking space adapted to receive a horizontally oriented flange on each of said hydrants.

18. The linear water feed apparatus of claim 1 wherein said docking station supports a forward dock stop mounted for movement between operative and inoperative positions and adapted to engage said hydrants in the operative position.

19. The linear water feed apparatus of claim 18 wherein said docking station supports a rearward dock stop mounted for movement between operative and inoperative positions and adapted to engage said hydrants in the operative position.

20. The linear water feed apparatus of claim 1 wherein each of said plurality of hydrants include a riser fixed to said supply pipe, and a substantially cylindrical water supply valve housing attached to said riser, said cylindrical water supply valve housing enclosing a water supply valve, said housing provided with an exterior radial flange adapted to be engaged by said docking station.

* * * * *